US011100448B1

(12) United States Patent
Plazola

(10) Patent No.: US 11,100,448 B1
(45) Date of Patent: Aug. 24, 2021

(54) INTELLIGENT SECURE NETWORKED SYSTEMS AND METHODS

(71) Applicant: Luis Antonio Plazola, San Jose, CA (US)

(72) Inventor: Luis Antonio Plazola, San Jose, CA (US)

(*) Notice: Subject to any disclaimer, the term of this patent is extended or adjusted under 35 U.S.C. 154(b) by 0 days.

(21) Appl. No.: 17/086,274

(22) Filed: Oct. 30, 2020

(51) Int. Cl.
*G06Q 10/06* (2012.01)
*G06F 21/33* (2013.01)
*G06F 21/53* (2013.01)
*G06F 16/29* (2019.01)

(52) U.S. Cl.
CPC ....... *G06Q 10/06375* (2013.01); *G06F 16/29* (2019.01); *G06F 21/335* (2013.01); *G06F 21/53* (2013.01)

(58) Field of Classification Search
CPC ........ G06F 16/29; G06F 21/335; G06F 21/53; G06Q 10/06375
See application file for complete search history.

(56) References Cited

U.S. PATENT DOCUMENTS

| 10,455,537 B2* | 10/2019 | Kautz ...................... G01S 5/06 |
| 10,630,650 B2* | 4/2020 | De Beer ............ H04L 63/0428 |
| 2018/0239948 A1* | 8/2018 | Rutschman ............... G06T 7/20 |
| 2018/0239984 A1* | 8/2018 | Shigeta ..................... G06T 7/90 |
| 2019/0130487 A1* | 5/2019 | De Beer ............ G06F 16/9574 |

\* cited by examiner

*Primary Examiner* — Arvin Eskandarnia
(74) *Attorney, Agent, or Firm* — Carr & Ferrell LLP

(57) ABSTRACT

According to some exemplary embodiments, an intelligent secure networked system is configured by at least one processor to execute instructions stored in memory, the system comprising a data retention system and a predictive analytics system, a web services layer providing access to the data retention and predictive analytics systems, and an application server layer that provides a user-facing application that accesses the data retention and predictive analytics systems through the web services layer and performs processing based on user interaction with a goal-based planning application, the goal-based planning application configured to execute instructions including applying artificial intelligence by detecting digital data, acting based upon a characteristic of the digital data, extracting an aspect of the digital data, applying predetermined logic to the aspect of the digital data, categorizing the digital data after application of the predetermined logic and formulating the categorized digital data for physical transformation.

29 Claims, 26 Drawing Sheets

INTELLIGENT SECURE NETWORKED SYSTEMS AND METHODS

FIELD OF THE TECHNOLOGY

The present technology relates generally to intelligent secure networked systems and methods and more particularly, but not by limitation, to systems and methods that allow modular subsystem isolation, as well as latency remediation and improved user experiences.

SUMMARY OF THE PRESENT TECHNOLOGY

According to some exemplary embodiments, an intelligent secure networked system is configured by at least one processor to execute instructions stored in memory, the system comprising a data retention system and a predictive analytics system, a web services layer providing access to the data retention and predictive analytics systems, and an application server layer that provides a user-facing application that accesses the data retention and predictive analytics systems through the web services layer and performs processing based on user interaction with a goal-based planning application, the goal-based planning application configured to execute instructions including applying artificial intelligence by detecting digital data, acting based upon a characteristic of the digital data, extracting an aspect of the digital data, applying predetermined logic to the aspect of the digital data, categorizing the digital data after application of the predetermined logic and formulating the categorized digital data for physical transformation.

Further exemplary embodiments include the data retention system and the predictive analytics system both in secure isolation from a remainder of the intelligent secure networked system. The user-facing application may be secured through use of a security token cached on a web browser that provides the user-facing application and the application server layer may perform asynchronous processing. Additionally, a batching service may be used where the application server layer transmits a request to the web services layer for data, the request processed by the batching service transparently to a user. Accordingly, the request processed by the batching service may be transparent to a user such that the user can continue to use the user-facing application without disruption.

The instructions, according to exemplary embodiments, may include the detecting including optically recognizing a context and determining an action based on the context. An aspect of the digital data to be extracted may be determined on the action. Various exemplary embodiments may include the predetermined logic including formulas, database information, and market data. The categorizing may be based on an element of the physical transformation.

Elements may include a roof of the structure, plumbing of the structure, framing of the structure, doors, and windows of the structure. The system may receive user input including a desired profit margin, a labor cost, a material selection, or a modification of an output. A database of the user inputs may be generated, including creating a subset of the database of the user inputs based upon a shared geographical region. The predetermined logic may include the user inputs based upon the shared geographical region.

In yet further exemplary embodiments, the formulating may include a report of an output, and the detecting may be based upon an algorithm. The algorithm may be adjusted based upon a previous output. Additionally, the formulating of the categorized digital data may include a user modification of an output. An input may be associated with the user modified output, and the user modified output may be automatically generated upon receiving the input. Also, additional predetermined logic may be applied to the aspect of the digital data to categorize the digital data for an additional category. The system may automatically recognize a discrepancy between the additional category and a former category that are both based on the aspect of the digital data and automatically remedying the discrepancy. The automatic remedying may be based on a previous occurrence of the discrepancy.

According to numerous exemplary embodiments, the acting may be based upon a second occurrence of the characteristic of the digital data. The extracting may be based upon a second occurrence of the aspect of the digital data. Also, the applying of the predetermined logic may be based upon a second occurrence of the aspect of the digital data. The categorizing of the digital data may be based upon a second application of the predetermined logic.

In some exemplary embodiments, the extracting is based upon a second occurrence of the aspect of the digital data. The applying of the predetermined logic may be based upon a second occurrence of the aspect of the digital data. Additionally, the categorizing of the digital data may be based upon a second application of the predetermined logic.

BRIEF DESCRIPTION OF THE DRAWINGS AND APPENDIX "A"

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Appendix "A" attached hereto and incorporated by reference highlights various exemplary aspects employed by the technology herein.

FIG. 1 is a schematic diagram of a computing architecture that includes a system constructed in accordance with the present disclosure.

FIG. 2. shows an exemplary method for extracting and processing page data.

DETAILED DESCRIPTION

Generally speaking, the present disclosure provides intelligent secure networked systems and methods. These systems and methods advantageously implement secure computing features and latency compensation features which allow the user to have an uninterrupted and secure user experience. In sum, a user can interact securely and without latency. By way of example, a user can perform various operations that may require data intensive operations by a backend system in response. These data/compute intensive operations, but for the solutions described herein, would result in latency or other similar deleterious effects that would decrease the user experience. The security features described herein can isolate both system components and data from unauthorized access.

Some embodiments allow components of the system to operate as a robotic advisor that designs and automatically implements actions in response to goals for a user.

In some embodiments, the systems and methods herein can continually review a plurality of factors for a user and selectively adjust actions based on the stated goal(s). These systems and methods can utilize machine learning to model data against goals and generate instruction sets in response to these analyses.

Some of the systems and methods disclosed herein comprise a re-balancer that may implement iterative machine learning in order to execute auto-configuration of factors to ensure that goal(s) will be achieved.

The systems and methods can also leverage deep analytics to make informed decisions. The systems can also automatically generate new suggestions for a user based on current or predicted probabilities and/or goal(s).

According to some embodiments, the systems and methods herein implement security layers that utilize SSL (secure socket layer) and encryption. These features, in addition to the token-based features described infra, provide solutions to problems that arise in extensible or modular computing environments.

Figure 1:
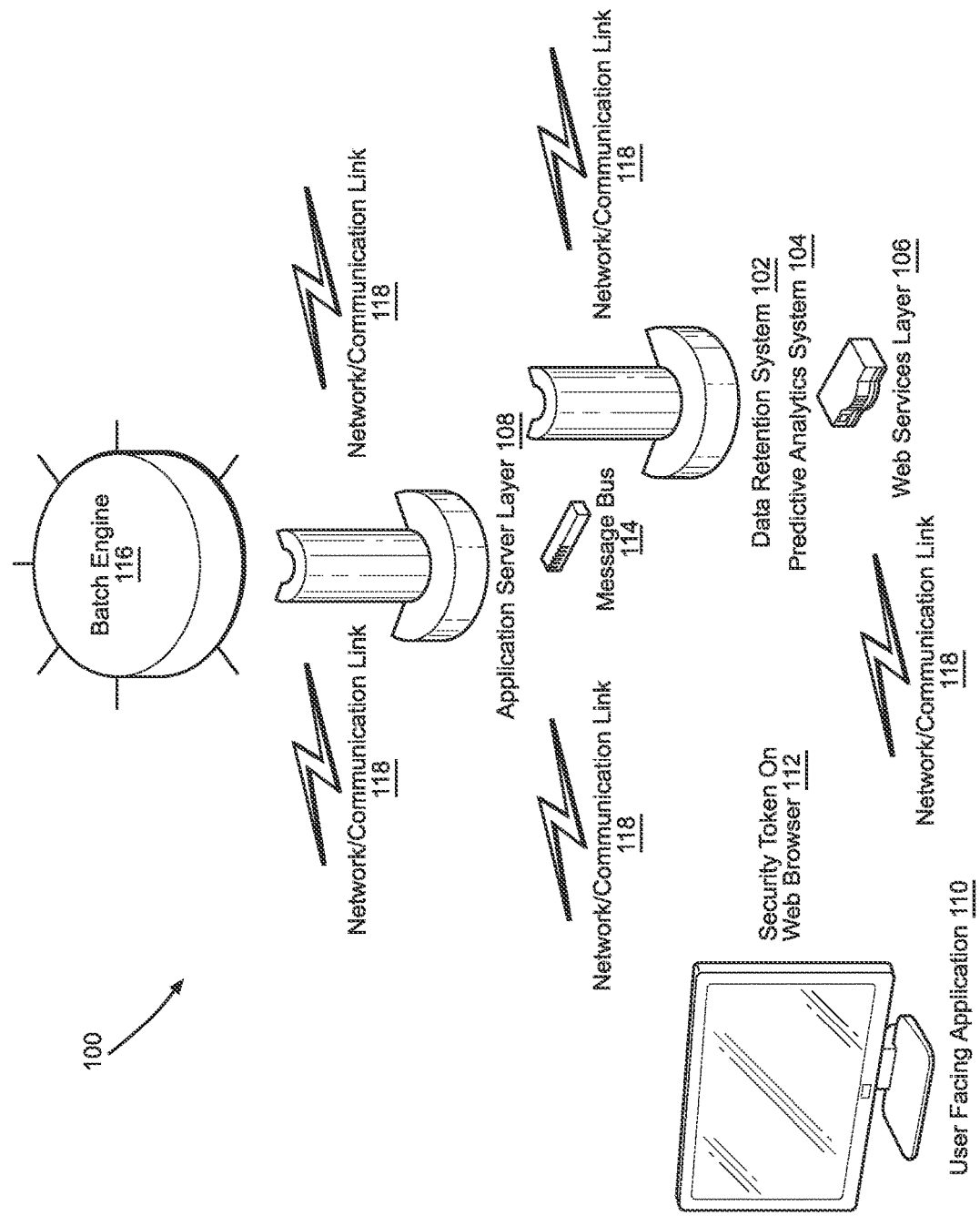

FIG. 1 is a schematic diagram of an example intelligent secure networked system (hereinafter system 100) for practicing aspects of the present disclosure. The system 100 comprises a data retention system 102, a predictive analytics system 104, a web services layer 106, and an application server layer 108 that provides, for example, modeling. Some or all of the activities occur over one or more network/communication links 118.

In some embodiments, the data retention system 102 and predictive analytics system 104 are in secure isolation from a remainder of the intelligent secure networked system 100 through a security protocol or layer. The data retention system 102 can also provide additional services such as logic, data analysis, risk model analysis, security, data privacy controls, data access controls, disaster recovery for data and web services—just to name a few.

The web services layer 106 generally provides access to the data retention system 102. According to some embodiments, the application server layer 108 is configured to provide a user-facing application 110 that accesses the data retention 102 and predictive analytics 104 systems through the web services layer 106. In some embodiments, the user-facing application 110 is secured through use of a security token cached on a web browser 112 that provides the user-facing application 110.

In one or more embodiments, the application server layer 108 performs asynchronous processing based on user interaction with a goal-based planning application (referred to herein as a user-facing application/interface) that processes data from a user. A goal-based planning application can reside and execute on the application server layer 108. In other embodiments, the goal-based planning application may reside with the predictive analytics system 104. In another embodiment, the goal-based planning application can be a client-side, downloadable application.

The systems of the present disclosure implement security features that involve the use of multiple security tokens to provide security in the system 100. Security tokens are used between the web services layer 106 and application server layer 108. In some embodiments, security features are not continuous to the web browser 112. Thus, a second security layer or link is established between the web browser 112 and application server layer, 108. In one or more embodiments, a first security token is cached in the application server layer 108 between the web browser 112 and the application server layer 108.

In some embodiments, the system 100 implements an architected message bus 114. In an example usage, a user requests a refresh of their data and user interface through their web browser 112. Rather than performing the refresh, which could involve data intensive and/or compute or operational intensive procedures by the system 100, the message bus 114 allows the request for refresh to be processed asynchronously by a batching process and provides a means for allowing the web browser 112 to continue to display a user-facing application to the user, allowing the user to continue to access data without waiting on the system 100 to complete its refresh.

Also, latency can be remediated at the user-facing application based on the manner with which the user-facing application is created and how the data that is displayed through the user-facing application is stored and updated. For example, data displayed on the user-facing application that changes frequently can cause frequent and unwanted refreshing of the entire user-facing application and GUIs. The present disclosure provides a solution to this issue by separating what is displayed on the GUI with the actual underlying data. The underlying data displayed on the GUI of the user-facing application 110 can be updated, as needed, on a segment-by-segment basis (could be defined as a zone of pixels on the display) at a granular level, rather than updating the entire GUI. That is, the GUI that renders the underlying data is programmatically separate from the underlying data cached by the client (e.g., device rendering the GUIs of the user-facing application). Due to this separation, when data being displayed on the GUI changes, re-rendering of the data is performed at a granular level, rather than at the page level. This process represents another example solution that remedies latency and improves user experiences with the user-facing application.

To facilitate these features, the web browser 112 will listen on the message bus 114 for an acknowledgement or other confirmation that the background processes to update the user account and/or the user-facing application have been completed by the application server layer 108. The user-facing application (or even part thereof) is updated as the system 100 completes its processing. This allows the user-facing application 110 provided through the web browser 112 to be usable, but heavy lifting is being done transparently to the user by the application server layer 108. In sum, these features prevent or reduce latency issues even when an application provided through the web browser 112 is "busy." For example, a re-balance request is executed transparently by the application server layer 108 and batch engine 116. This type of transparent computing behavior by the system 100 allows for asynchronous operation (initiated from the application server layer 108 or message bus 114).

In some embodiments, a batch engine 116 is included in the system 100 and works in the background to process re-balance requests and coordinate a number of services. An example re-balance request would include an instance where a user selectively changes a goal. The batch engine 116 will transparently orchestrate the necessary operations required by the application server layer 108 in order to obtain data.

According to some embodiments, the batch engine 116 is configured to process requests transparently to a user so that the user can continue to use the user-facing application 110 without disruption. For example, this transparent processing can occur when the application server layer 108 transmits a request to the web services layer 106 for data, and a time required for updating or retrieving the data meets or exceeds a threshold. For example, the threshold might specify that if the request will take more than five seconds to complete, then the batch engine 116 can process the request transparently. The selected threshold can be system configured.

In some embodiments, security of data transmission through the system 100 is improved by use of multiple security tokens. In one embodiment a security token cached on the web browser 112 is different from a security protocol or security token utilized between the application server layer 108 and the web services layer 106.

Figure 2:
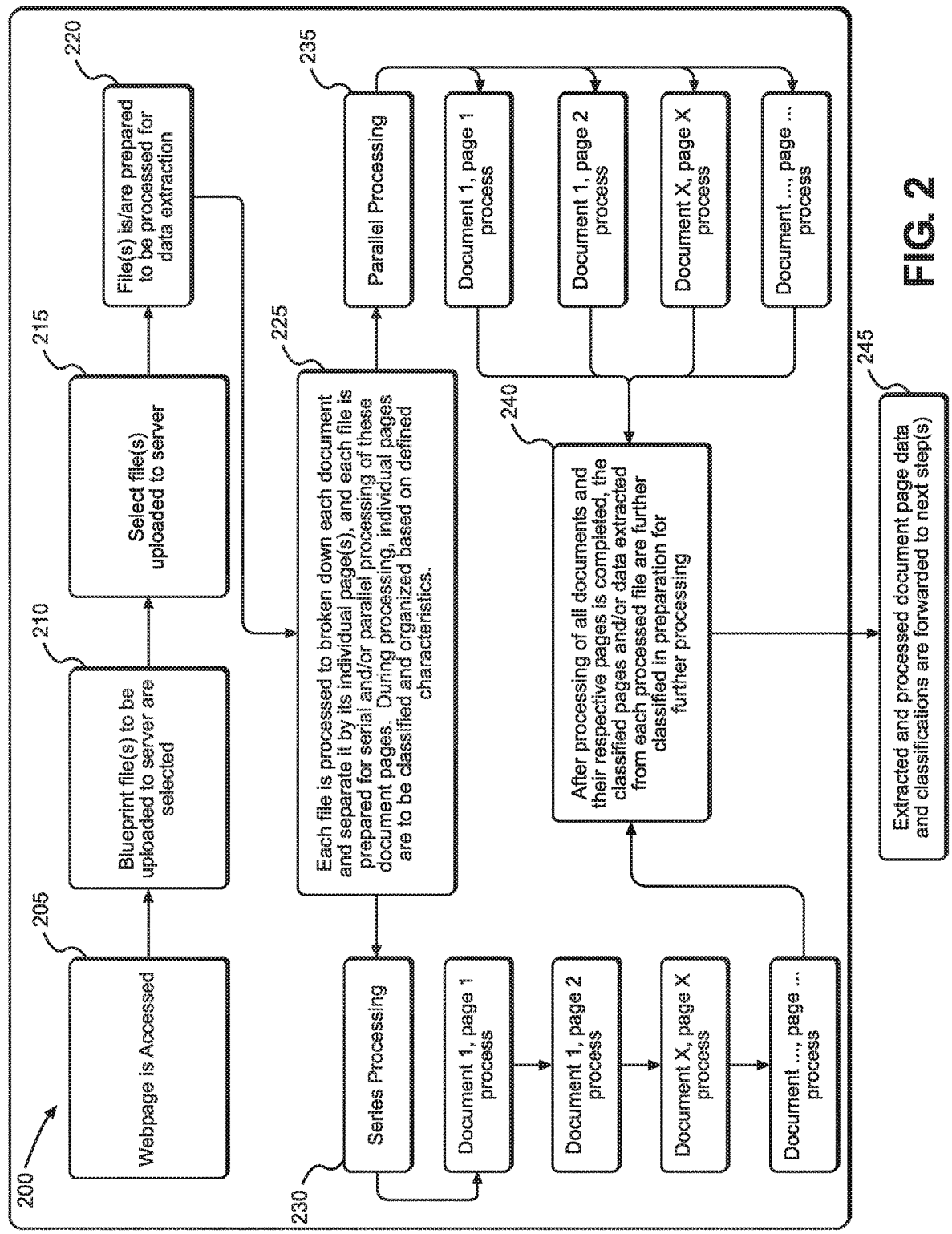

FIG. 2 shows an exemplary method 200 for extracting and processing page data.

At step 205, a web page is accessed.

At step 210, blueprint files to be uploaded to the server are selected.

At step 215, selected files are uploaded to the server.

At step 220, files are prepared to be processed for data extraction.

At step 225, each file is broken down and separated by its individual pages. Each file is prepared for serial and/or parallel processing of document pages. During processing, individual pages are to be classified and organized based on defined characteristics.

At step 230, series processing is performed.

At step 235, parallel processing is performed.

At step 240, after processing all of the documents and their respective pages, the classified pages and/or data extracted from each processed file are further classified in preparation for further processing.

Figure 3:
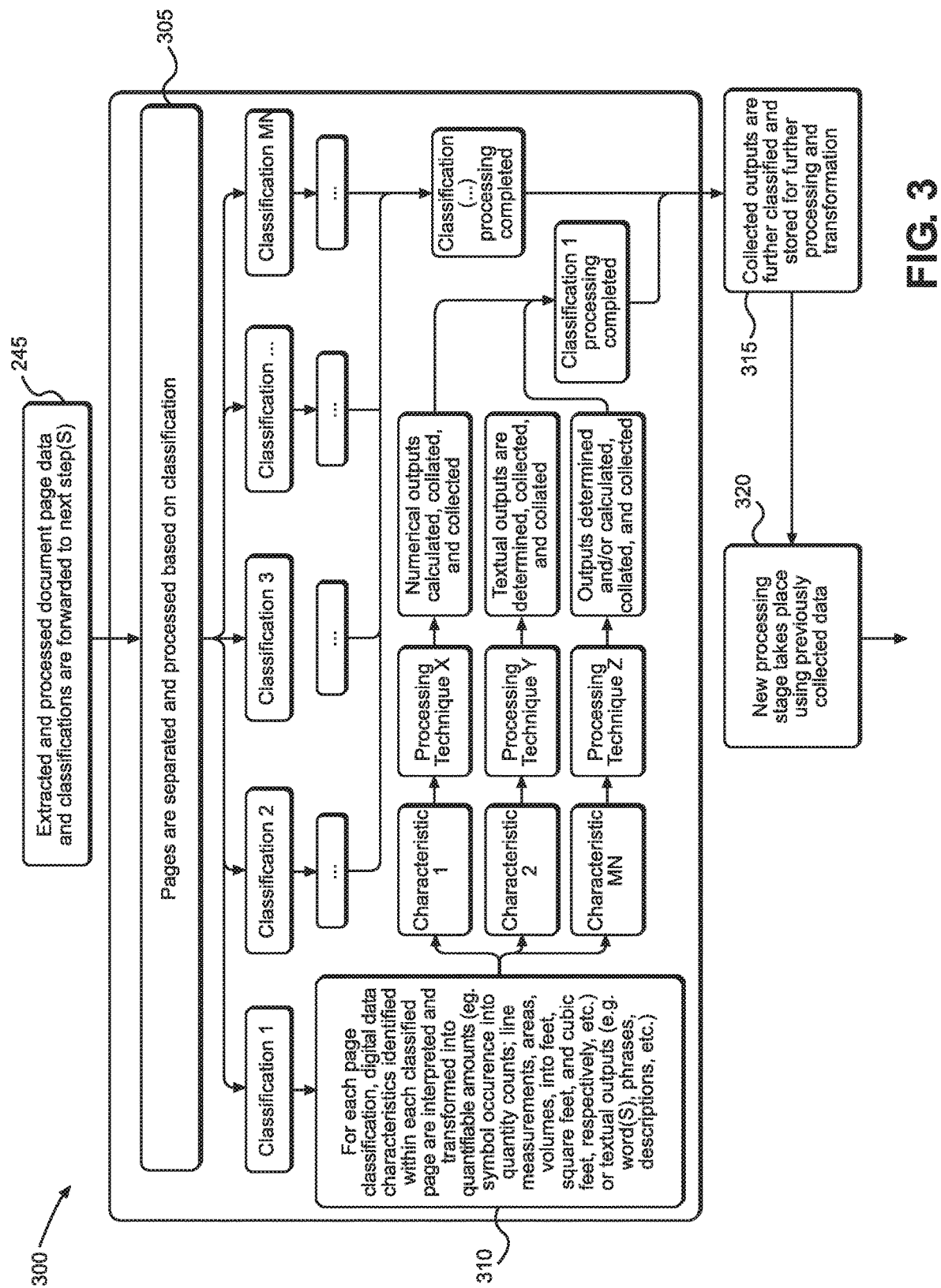
FIG. 3 shows the processing of the extracted and processed document page data and classifications.

At step 245, extracted and processed document page data and classifications are forwarded to the next steps shown in FIG. 3.

FIG. 3 shows the processing 300 of the extracted and processed document page data and classifications.

At step 305, pages are separated and processed based on classification.

At step 310, for each page classification, digital data characteristics identified within each classified page are interpreted and transformed into quantifiable amounts. For example, symbol occurrence into quantity counts, line measurements, areas, volumes, into feet, square feet and cubic feet respectively, or textual outputs, for example, words, phrases, descriptions, etc.

For example, Appendix page one shows some exemplary abbreviations that may be extracted. Appendix page three shows common blueprint symbols that may be extracted.

At step 315, collected outputs are further classified and stored for further processing and transformation.

At step 320, a new processing stage takes place using previously collected data.

Figure 6:
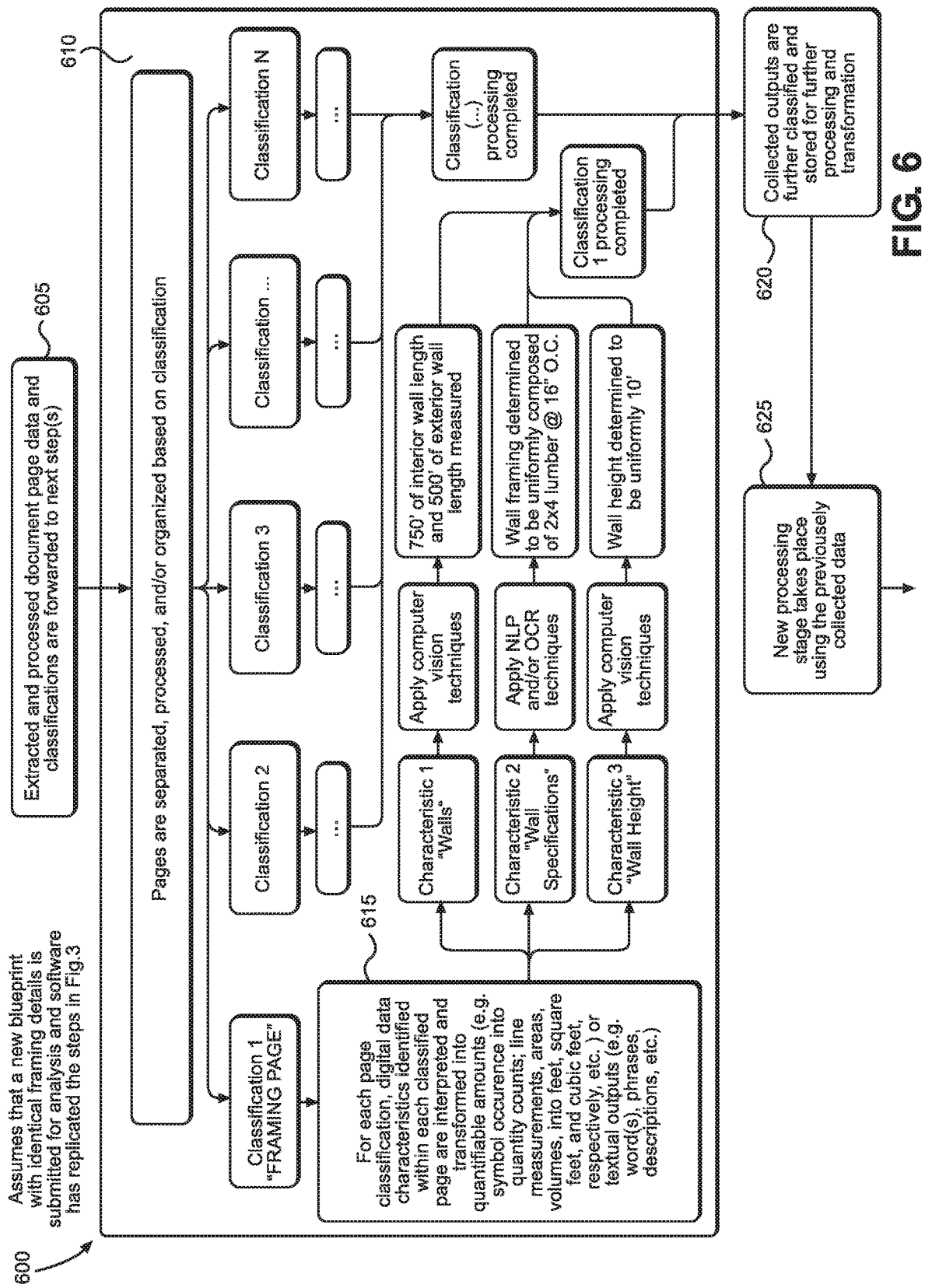
FIG. 6 shows the processing of the extracted and processed document page data and classifications. This assumes that a new blueprint with identical framing details is submitted for analysis and the software has replicated the steps in FIG. 3.

Please note, briefly referencing FIG. 6, exemplary characteristics may include "walls," "wall specifications," and "wall height," processing techniques may include "applying computer vision techniques," "applying natural language processing," and/or "optical character recognition techniques." Numerical outputs may include such things as the interior wall length, the exterior wall length, and textual outputs may include "wall framing determined to be uniformly composed," "wall height determined to be uniformly 10'," and the like.

Figure 4A:
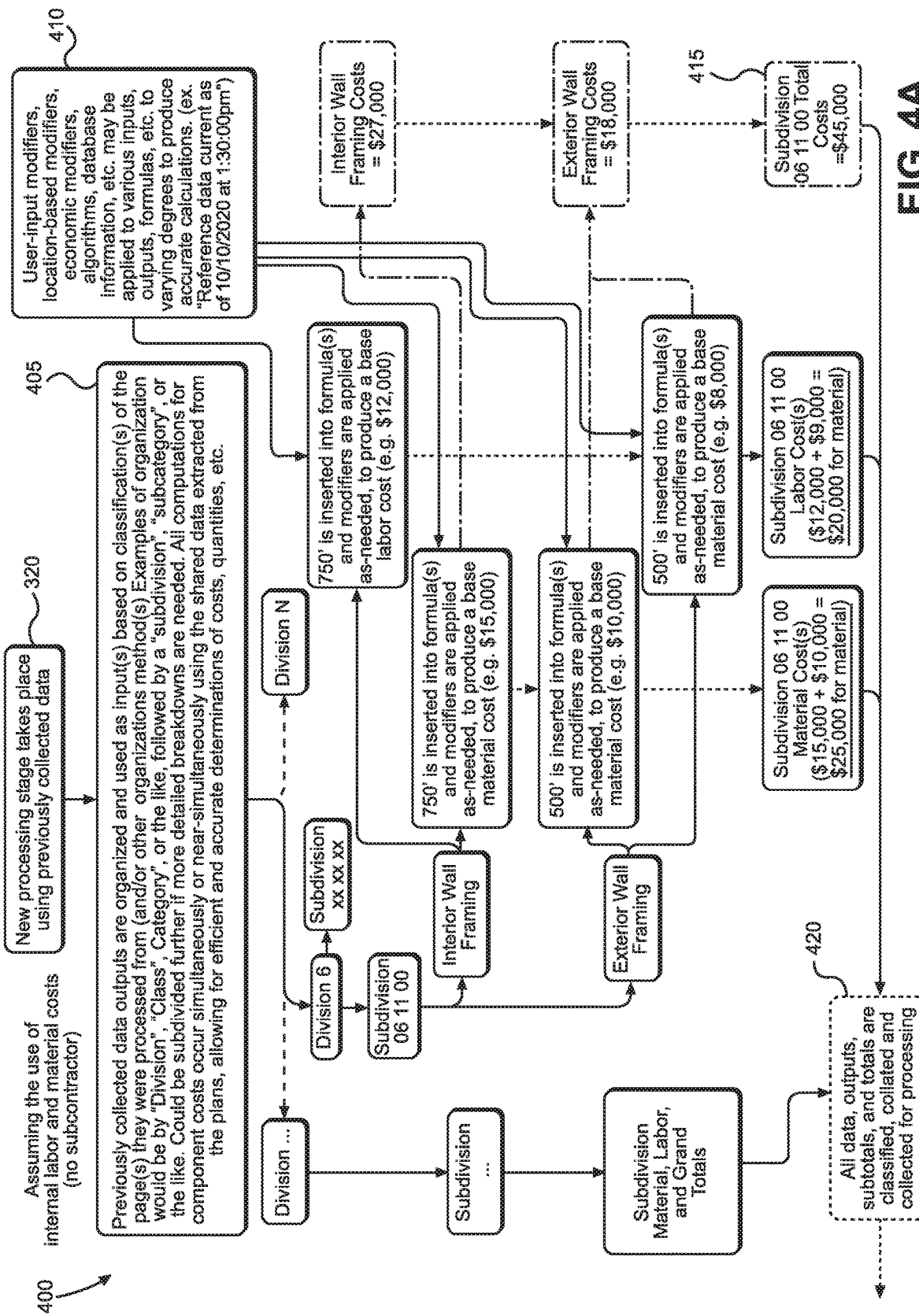
FIG. 4A shows the new processing stage using previously collected data.

FIG. 4A shows the new processing stage 400 using previously collected data.

This assumes the use of internal labor and material costs. There are no subcontractor costs.

At step 405, previously collected data outputs are organized and used as inputs, based on classifications of the pages they were processed from and or other organization methods. Examples of organization would be by "Division," "Class," "Category," or the like, followed by a "subdivision," "subcategory," or the like. It could be subdivided further if more detailed breakdowns are needed. All computations for component costs occur simultaneously or near simultaneously using the shared data extracted from the plans, allowing for efficient and accurate determination of costs quantities, etc.

At step 410, user-input modifiers, location-based modifiers, economic modifiers, algorithms, database information, etc. may be applied to various inputs, outputs formulas etc. to varying degrees to produce accurate calculations.

At step 415, subdivision total costs are determined.

At step 420, all data, outputs, subtotals and totals are classified, collated, and collected for processing.

Figure 4B:
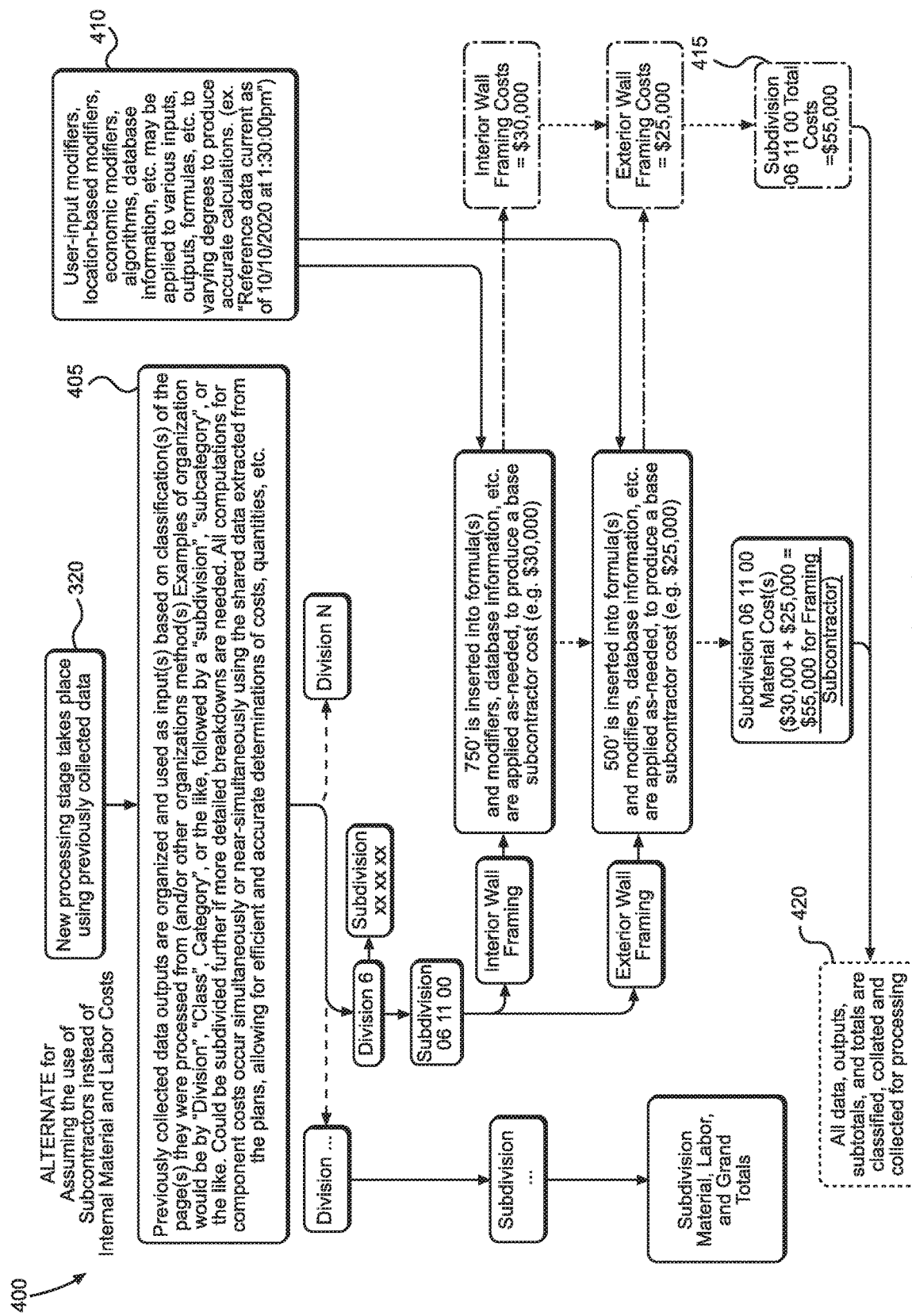
FIG. 4B shows an alternative new processing stage using previously collected data.

FIG. 4B shows an alternative new processing stage 400 using previously collected data. This assumes the use of subcontractors instead of internal material and labor costs.

Figure 5:
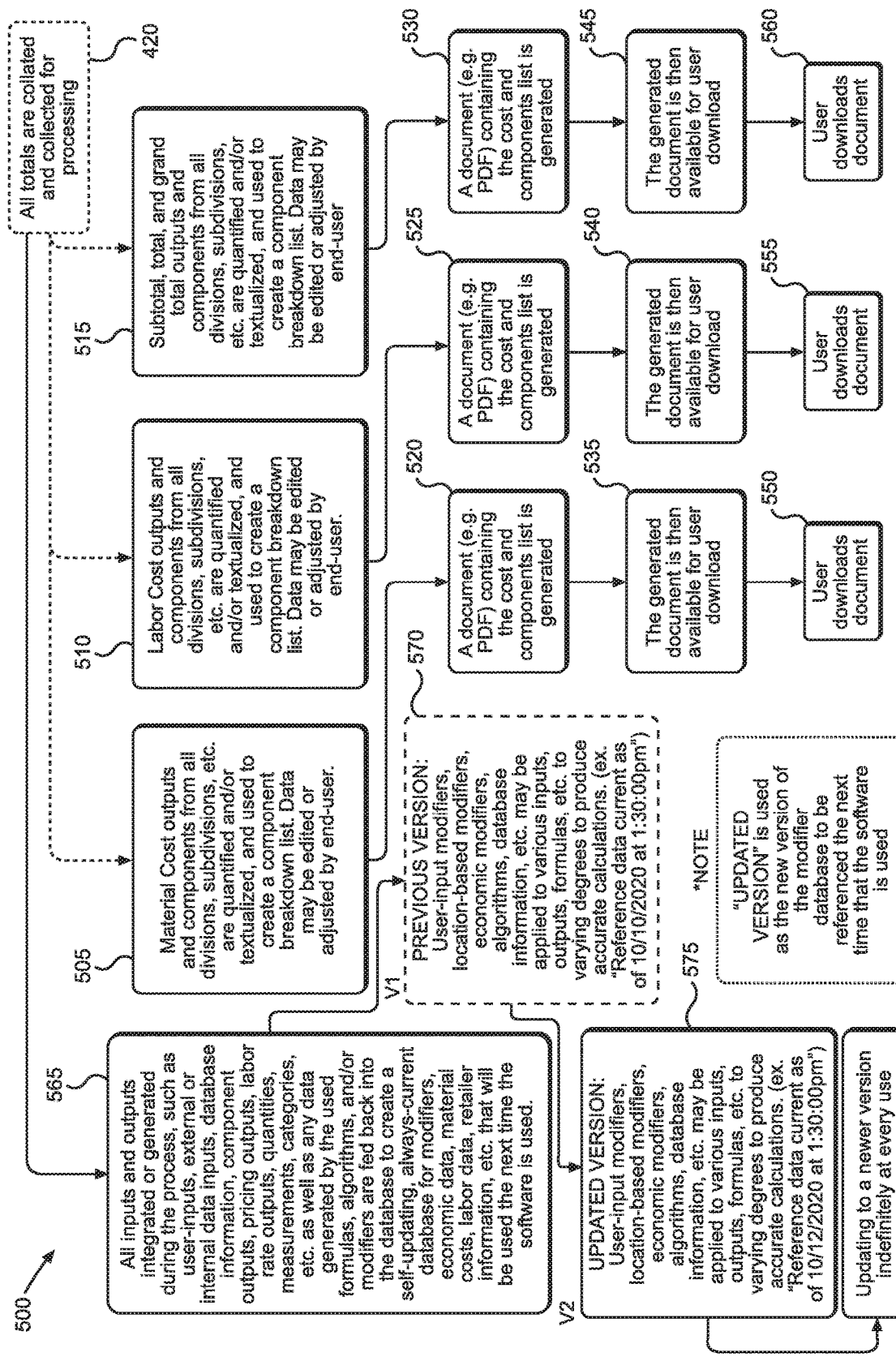
FIG. 5 shows the processing of all totals that are collated and collected for processing.

FIG. 5 shows the processing 500 of all totals that are collated and collected for processing.

At step 505, material cost outputs and components from all divisions, subdivisions, etc. are quantified and/or textualized and used to create a component breakdown list. Data may be edited or adjusted by the end user.

At step 510, labor cost outputs and components from all divisions, subdivisions, etc. are quantified and/or textualized and used to create a component breakdown list. Data may be edited or adjusted by the end user.

At step 515, subtotal, total and grand total outputs and components from all divisions, subdivisions, etc., are quantified and/or textualized and used to create a component breakdown list. Data may be edited or adjusted by the end user.

Steps 520, 525 and 530 are essentially the same. That is, a document (for example, PDF) containing the cost and components list is generated.

Steps 535, 540 and 545 are all essentially the same. That is, the generated document is then available for the user to download.

Steps 550, 555 and 560 are all essentially the same. The user downloads a document.

At step 565, all inputs and outputs integrated or generated during the process, such as user inputs, external or internal data inputs, database information, component outputs, pricing outputs, labor rate outputs, quantities, measurements, categories, etc. as well as any data generated by the used formulas, algorithms and/or modifiers are fed back into the database to create a self-updating, always current database for modifiers, economic data, material costs, labor data, retailer information, etc. that will be used the next time the software is used.

At step 570, using a previous version of the system, user input modifiers, location-based modifiers, economic modifiers, algorithms, database information etc. may be applied to various inputs, outputs, formulas, etc. to varying degrees to produce accurate calculations.

At step 575, an updated version of the system is created: user input modifiers, location-based modifiers, economic modifiers, algorithms, database information etc. may be applied to various inputs, outputs, formulas, etc. to varying degrees to produce accurate calculations.

Please note, the updated version is used as the new version of the modifier database to be referenced the next time that the software is used.

FIG. 6 shows the processing 600 of the extracted and processed document page data and classifications. This assumes that a new blueprint with identical framing details is submitted for analysis and the software has replicated the steps in FIG. 3.

At 605, extracted and processed document page data and classifications are forwarded to the following steps.

At step 610, pages are separated and processed based on classification.

At step 615, for each page classification, digital data characteristics identified within each classified page are interpreted and transformed into quantifiable amounts. For example, symbol occurrence into quantity counts, line measurements, areas, volumes, into feet, square feet and cubic feet respectively, or textual outputs, for example, words, phrases, descriptions, etc.

For example, Appendix page one shows some exemplary abbreviations that may be extracted. Appendix page three shows common blueprint symbols that may be extracted.

At step 620, collected outputs are further classified and stored for further processing and transformation.

At step 625, a new processing stage takes place using previously collected data.

Figure 7A:
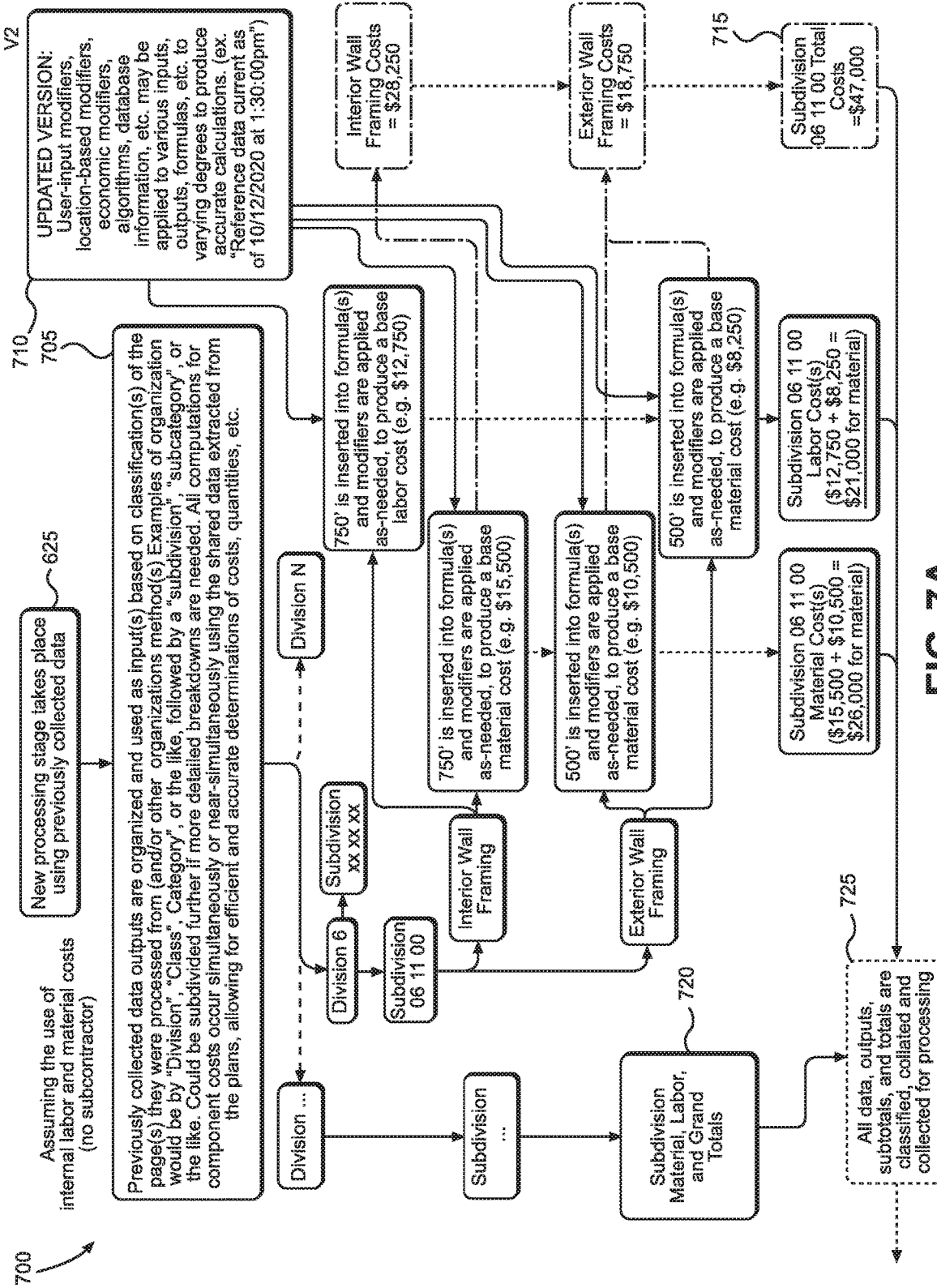
FIG. 7A shows the new processing stage using previously collected data.

FIG. 7A shows the new processing stage 700 using previously collected data.

This assumes the use of internal labor and material costs. There are no subcontractor costs.

At step 705, previously collected data outputs are organized and used as inputs, based on classifications of the pages they were processed from and or other organization methods. Examples of organization would be by "Division," "Class," "Category," or the like, followed by a "subdivision," "subcategory," or the like. It could be subdivided further if more detailed breakdowns are needed. All computations for component costs occur simultaneously or near simultaneously using the shared data extracted from the plans, allowing for efficient and accurate determination of costs quantities, etc.

At step 710, updated user-input modifiers, location-based modifiers, economic modifiers, algorithms, database information, etc. may be applied to various inputs, outputs formulas etc. to varying degrees to produce accurate calculations.

At step 715, subdivision total costs are determined.

At step 720, subdivision material, labor and grand totals are factored in.

At step 725, all data, outputs, subtotals and totals are classified, collated, and collected for processing.

Figure 7B:
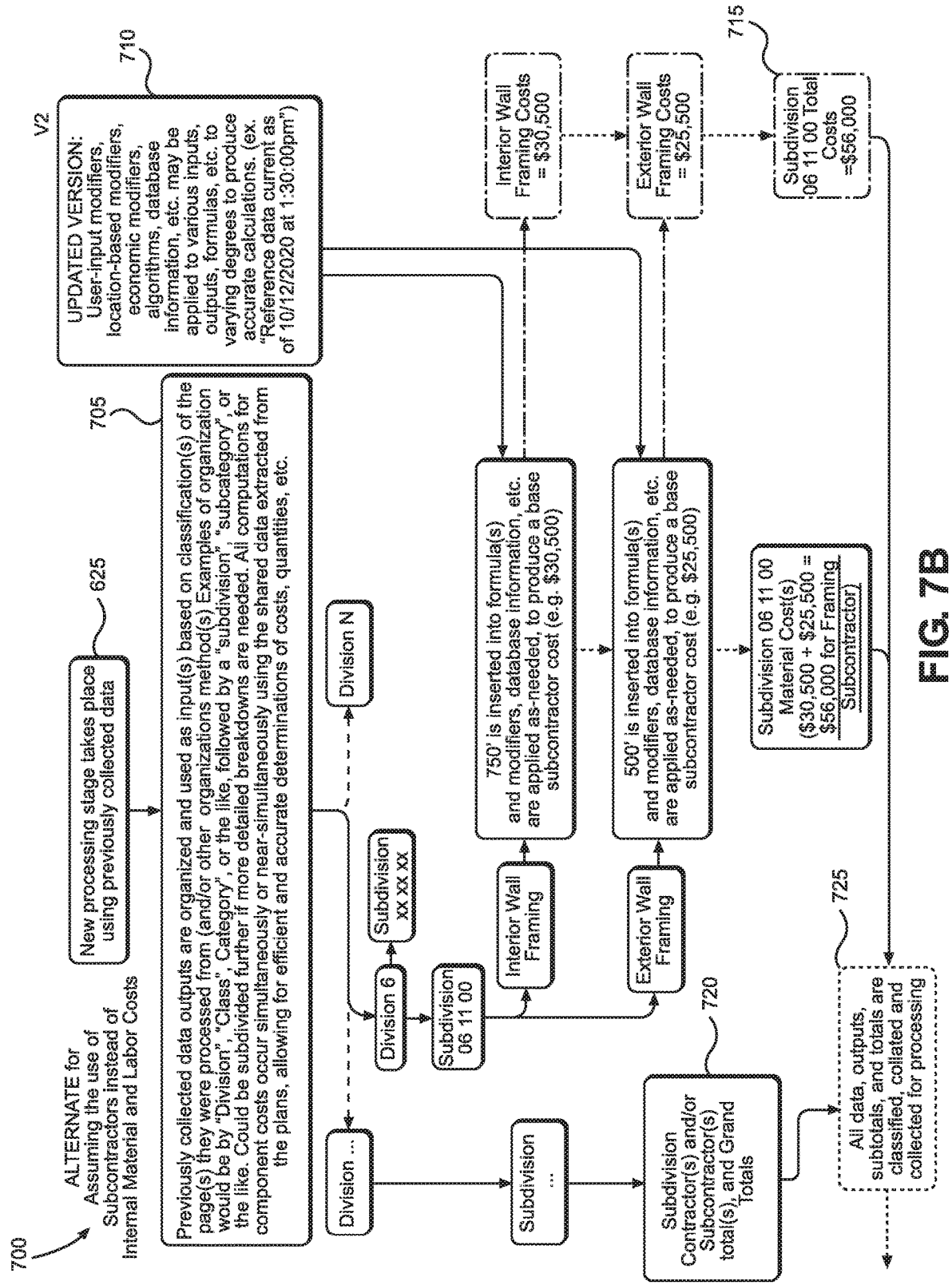
FIG. 7B shows an alternative new processing stage using previously collected data.

FIG. 7B shows the new processing stage 700 using previously collected data.

This assumes the use of subcontractors instead of internal material and labor costs.

At step 705, previously collected data outputs are organized and used as inputs, based on classifications of the pages they were processed from and or other organization methods. Examples of organization, would be by "Division," "Class," "Category," or the like, followed by a "subdivision," "subcategory," or the like. It could be subdivided further if more detailed breakdowns are needed. All computations for component costs occur simultaneously or near simultaneously using the shared data extracted from the plans, allowing for efficient and accurate determination of costs quantities, etc.

At step 710, updated user-input modifiers, location-based modifiers, economic modifiers, algorithms, database information, etc. may be applied to various inputs, outputs formulas etc. to varying degrees to produce accurate calculations.

At step 715, subdivision total costs are determined.

At step 720, subdivision material, labor and grand totals are factored in.

At step 725, all data, outputs, subtotals and totals are classified, collated, and collected for processing.

Figure 8:
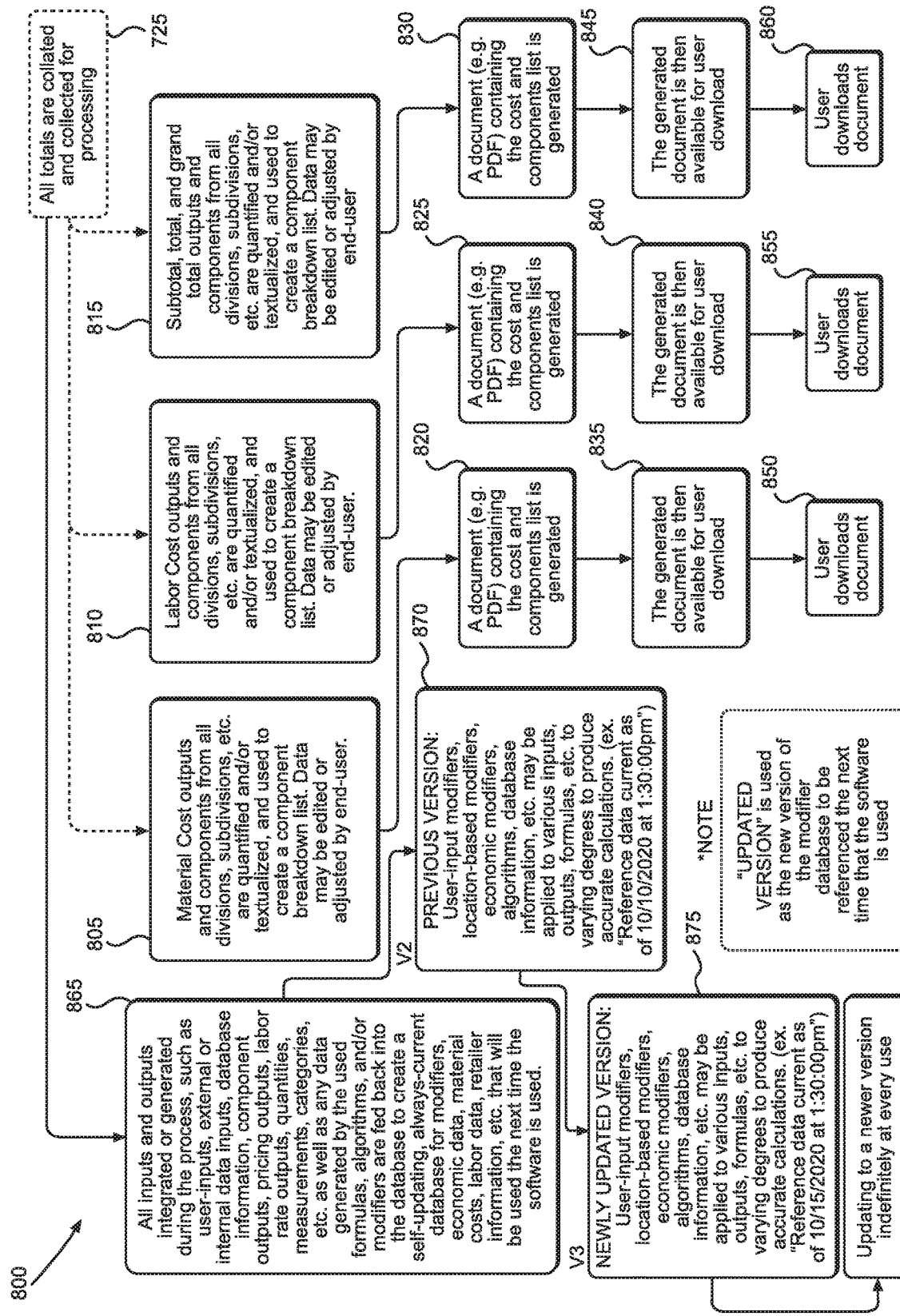
FIG. 8 shows the processing of all totals that are collated and collected for processing.

FIG. 8 shows the processing 800 of all totals that are collated and collected for processing.

At step 805, material cost outputs and components from all divisions, subdivisions, etc. are quantified and/or textualized and used to create a component breakdown list. Data may be edited or adjusted by the end user.

At step 810, labor cost outputs and components from all divisions, subdivisions, etc. are quantified and/or textualized and used to create a component breakdown list. Data may be edited or adjusted by the end user.

At step 815, subtotal, total and grand total outputs and components from all divisions, subdivisions, etc., are quantified and/or textualized and used to create a component breakdown list. Data may be edited or adjusted by the end user.

Steps 820, 825 and 830 are essentially the same. That is, a document (for example, PDF) containing the cost and components list is generated.

Steps 835, 840 and 845 are all essentially the same. That is, the generated document is then available for the user to download.

Steps by 850, 855 and 860 are all essentially the same. The user downloads a document.

At step 865, all inputs and outputs integrated or generated during the process, such as user inputs, external or internal data inputs, database information, component outputs, pricing outputs, labor rate outputs, quantities, measurements, categories, etc. as well as any data generated by the used formulas, algorithms and/or modifiers are fed back into the database to create a self-updating, always current database for modifiers, economic data, material costs, labor data, retailer information, etc. that will be used the next time the software is used.

At step 870, using a previously updated version of the system, user input modifiers, location-based modifiers, economic modifiers, algorithms, database information etc. may be applied to various inputs, outputs, formulas, etc. to varying degrees to produce accurate calculations.

At step 875, a newly updated version of the system is created: user input modifiers, location-based modifiers, economic modifiers, algorithms, database information etc. may be applied to various inputs, outputs, formulas, etc. to varying degrees to produce accurate calculations.

Please note, the updated version is used as the new version of the modifier database to be referenced the next time that the software is used.

Figure 9:
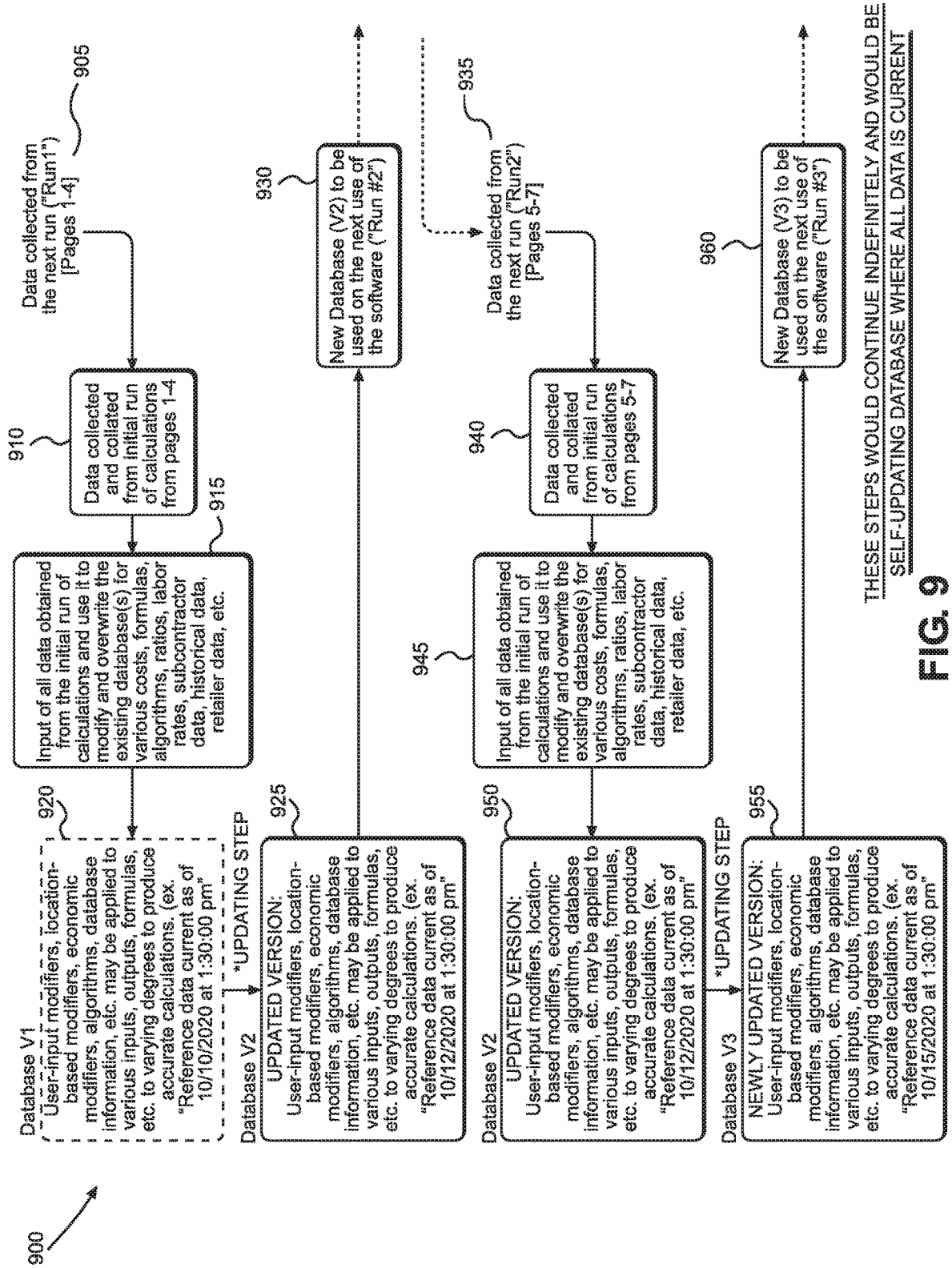
FIG. 9 shows the intelligence of the exemplary systems described herein.

FIG. 9 shows the intelligence 900 of the exemplary systems described herein.

At step 905, data is collected from run one of the system.

At step 910, the data collected from run one is collated.

At step 915, input of all data obtained from run one of calculations and is used to modify and overwrite existing databases for various costs, formulas, algorithms, ratios, labor rates, subcontractor data, historical data, retailer data, etc.

At step 920, database version 1 is created: user input modifiers, location-based modifiers, economic modifiers, algorithms, database information etc. may be applied to various inputs, outputs, formulas, etc. to varying degrees to produce accurate calculations.

At step 925, database version 2 is created by updating database version 1.

At step 930, database version 2 is used on the next use of the software for run 2.

At step 935, data is collected from run two of the system.

At step 940, the data collected from run two is collated.

At step 945, input of all data obtained from run two of calculations and is used to modify and overwrite existing databases for various costs, formulas, algorithms, ratios, labor rates, subcontractor data, historical data, retailer data, etc.

At step 950, database version 2 is updated.

At step 955, database version 3 is created.

At step 960, database version 3 is used on the next use of the software for run 3.

Please note: these steps would continue indefinitely and would be a self-updating database where all data is current.

FIGS. 10 through 24 illustrate the artificial intelligence of the exemplary systems and methods described herein.

Figure 10:
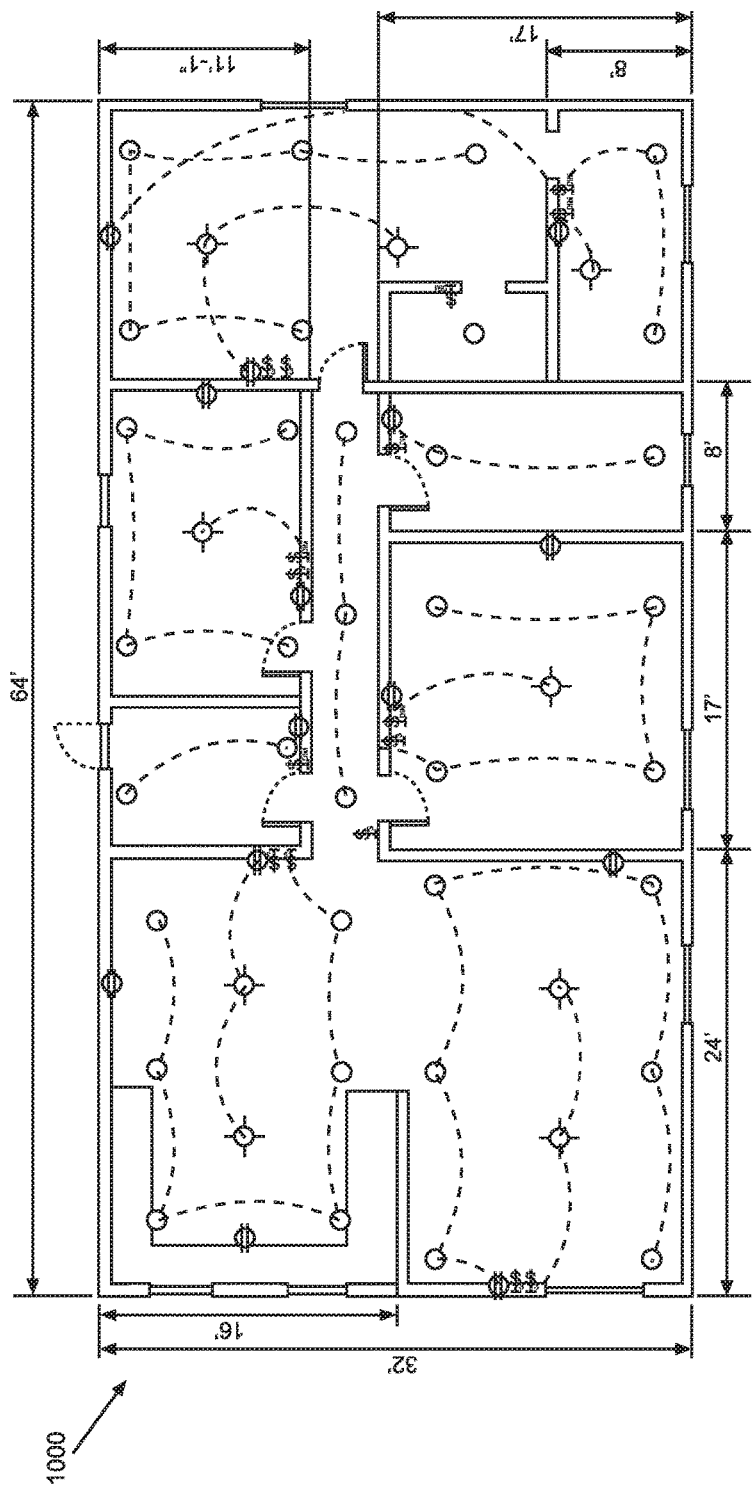
FIGS. 10 through 24 illustrate the artificial intelligence of the exemplary systems and methods described herein.
Figure 11:
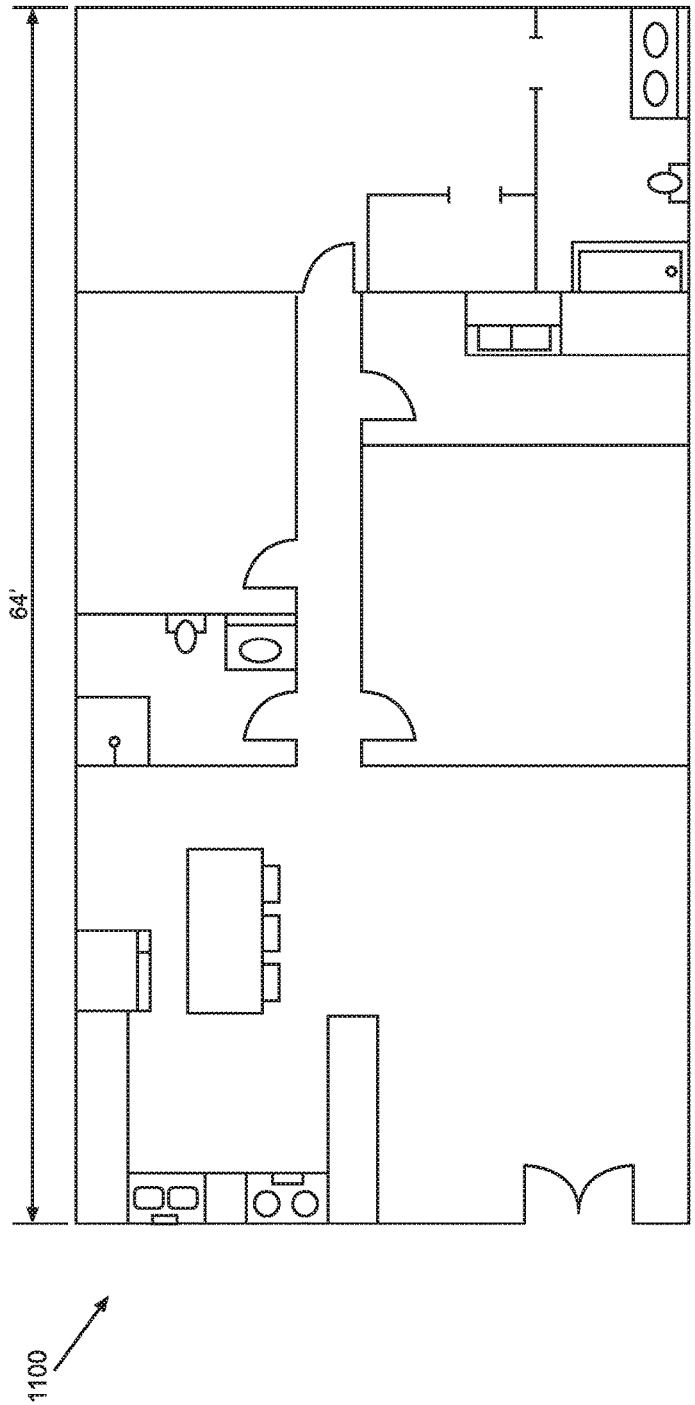

FIGS. 10-11 show exemplary input for the system and the system's ability to recognize various architectural symbols in a floor plan. Please refer to Appendix A for a more complete listing of the symbols and text the system is capable of recognizing.

Figure 12:
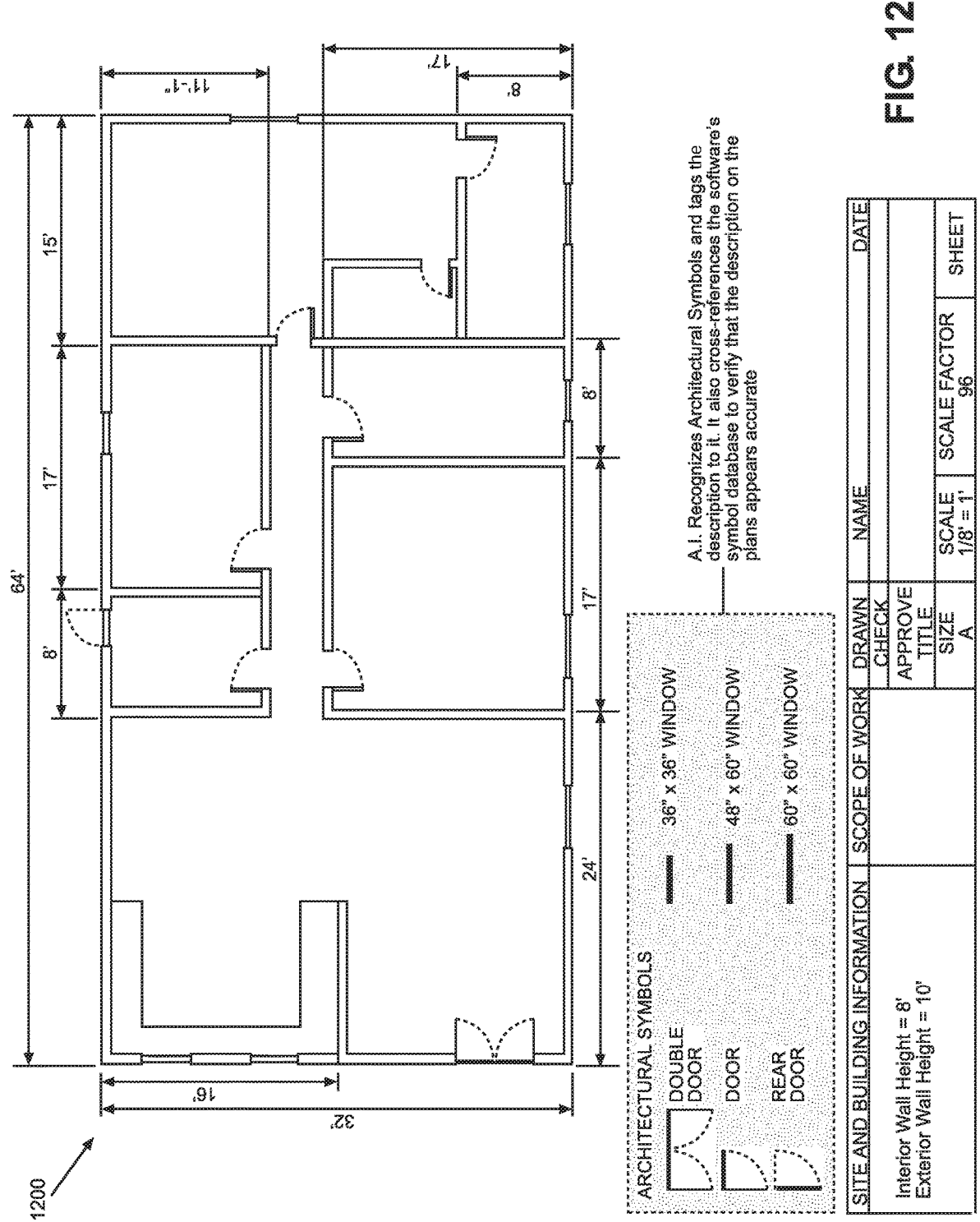

FIG. 12 shows that the artificial intelligence of the system recognizes architectural symbols and tags the description to the symbols. The system also cross-references the software's symbol database to verify that the description on the plans appears accurate.

Figure 13:
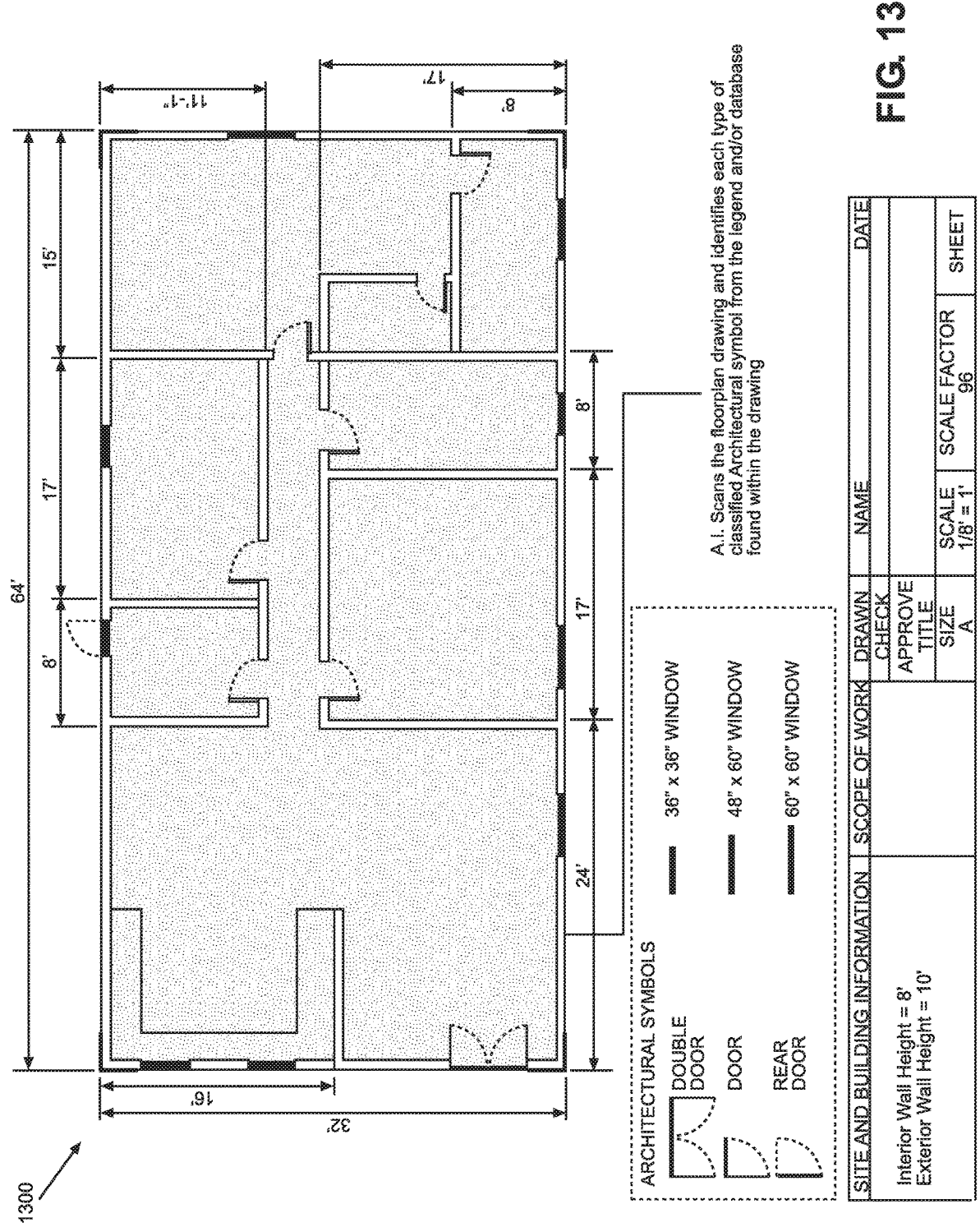

FIG. 13 shows that the artificial intelligence of the system scans a floorplan drawing and identifies each type of classified architectural symbol from the legend and/or or database found within the drawing.

Figure 14:
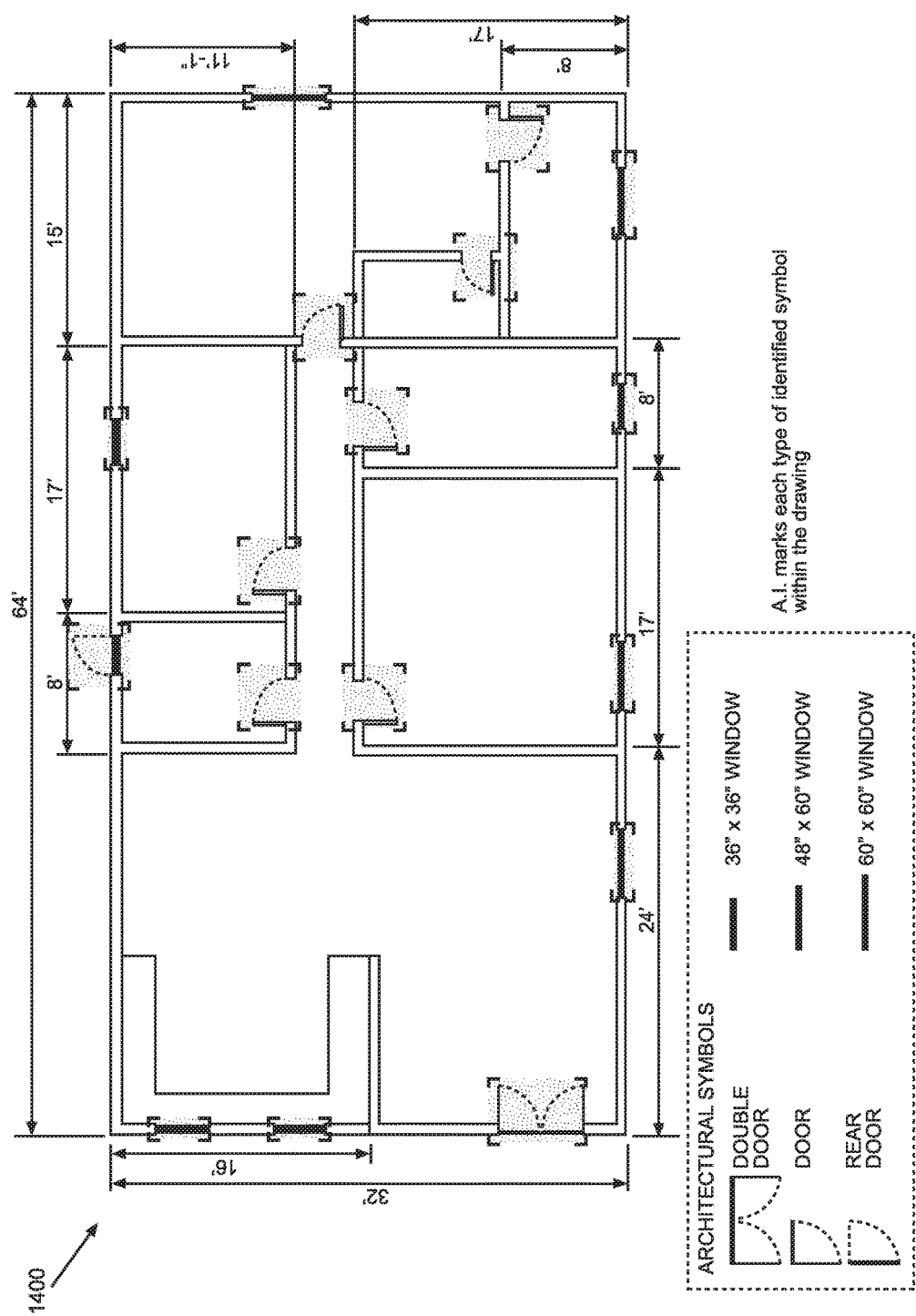

FIG. 14 shows that the artificial intelligence of the system marks each type of identified symbol within the drawing.

Figure 15:
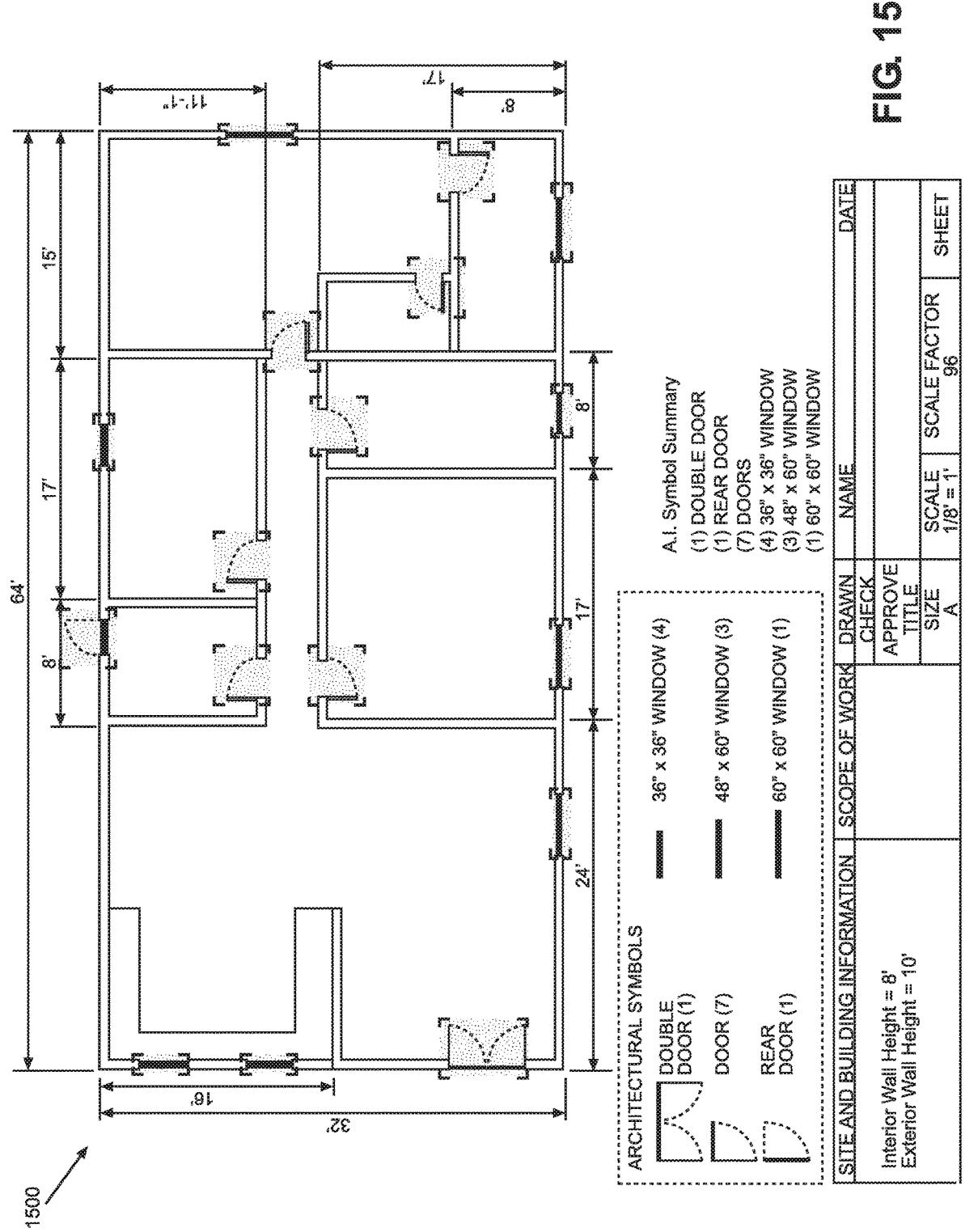

FIG. 15 shows the artificial intelligence of the system has quantified a symbol summary in terms of the number of double doors, rear doors, doors and the various windows required. The artificial intelligence of the system determines such things as the heights of the interior and exterior walls.

Figure 16:
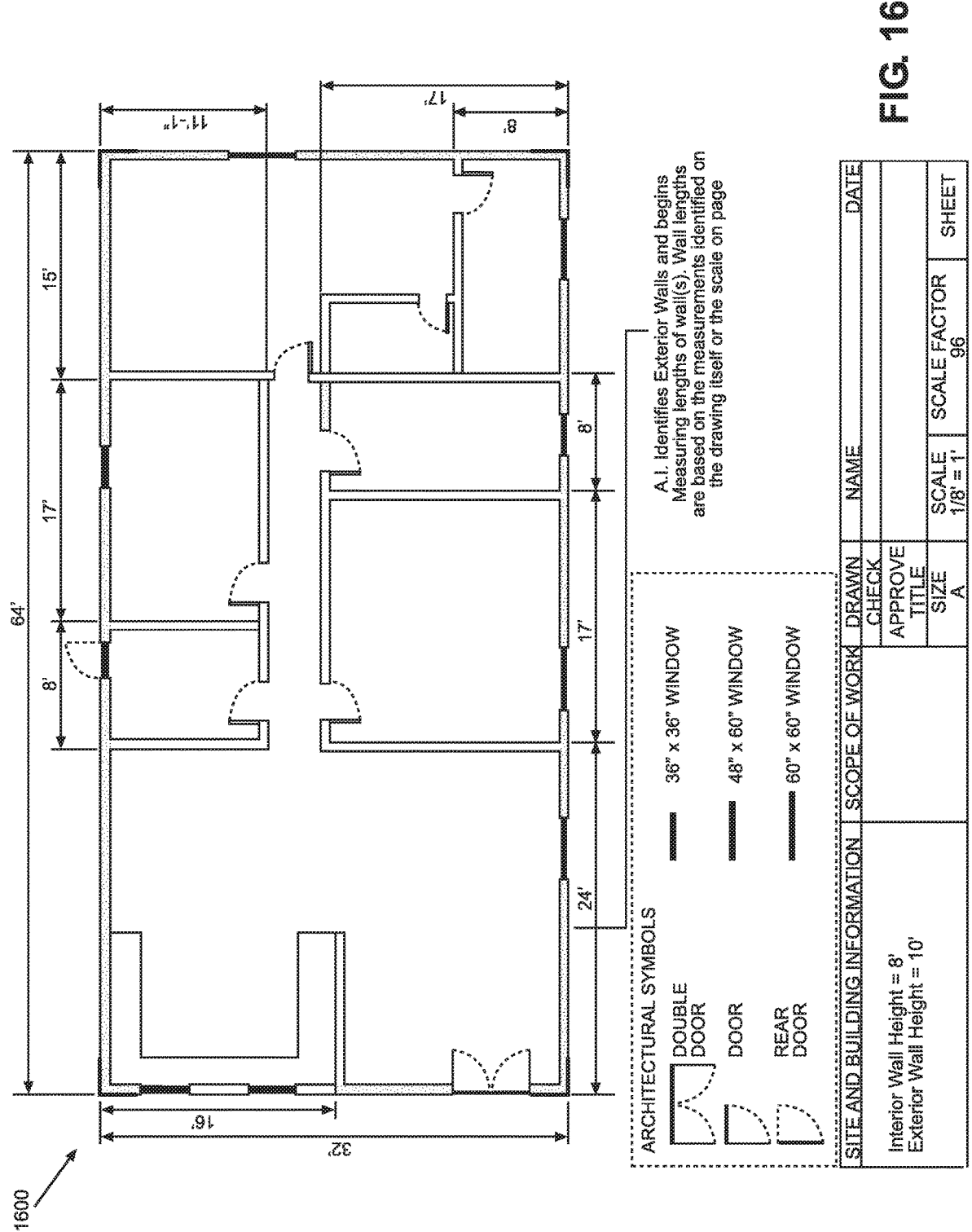

FIG. 16 shows that the artificial intelligence of the system identifies exterior walls and begins measuring the lengths of the walls. In some exemplary embodiments, wall lengths are based on the measurements identified on the drawing itself or the scale on the page.

Figure 17:
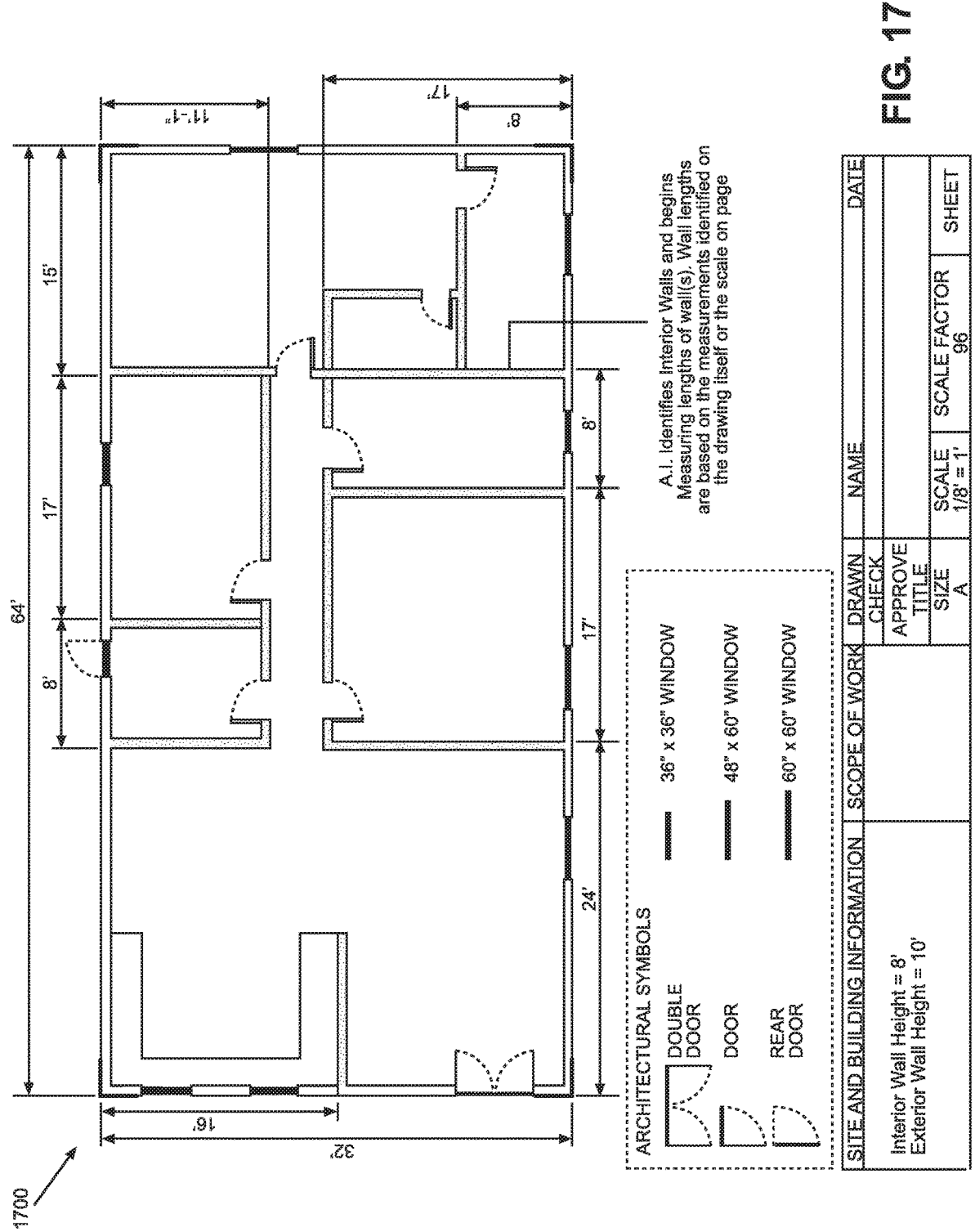

FIG. 17 shows the artificial intelligence of the system identifies the interior walls and begins measuring the lengths of the walls based on the measurements identified on the drawing itself or the scale on the page.

Figure 18:
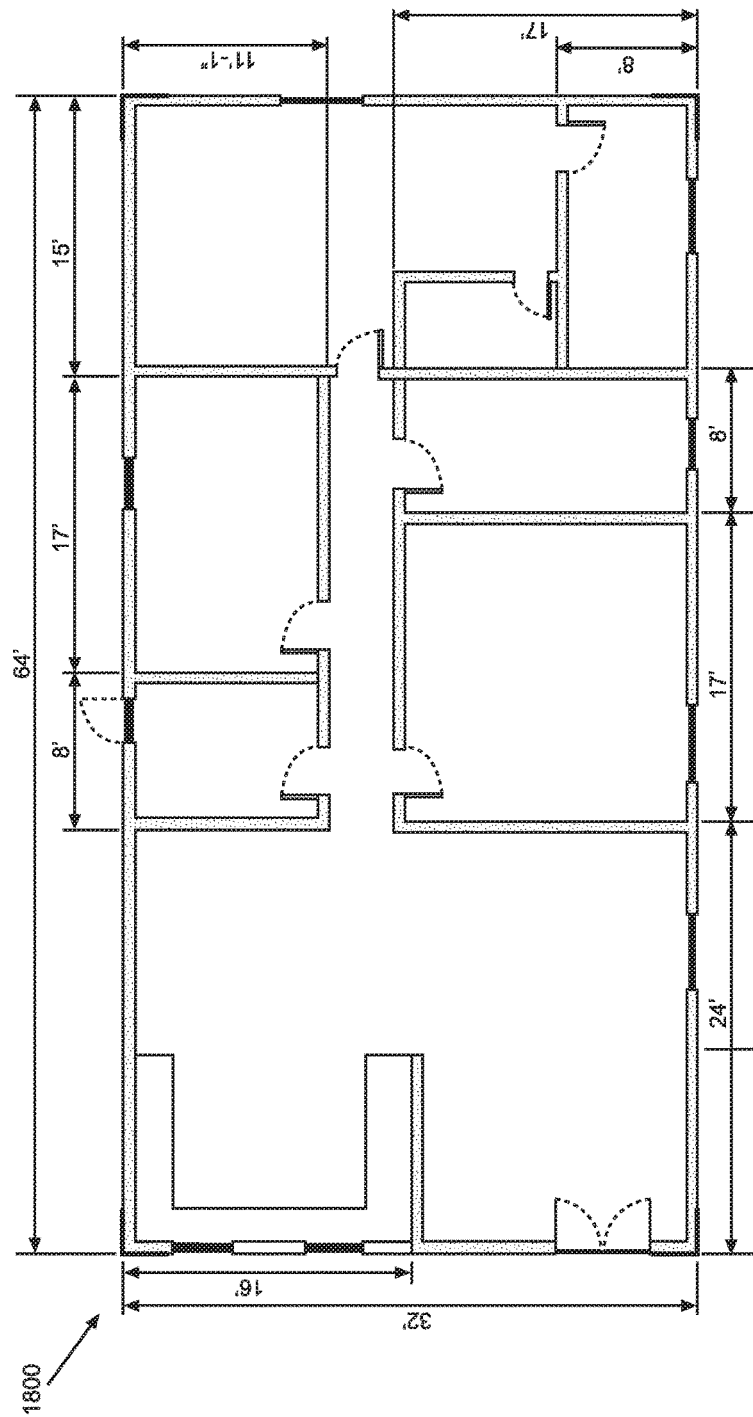
Figure 19:
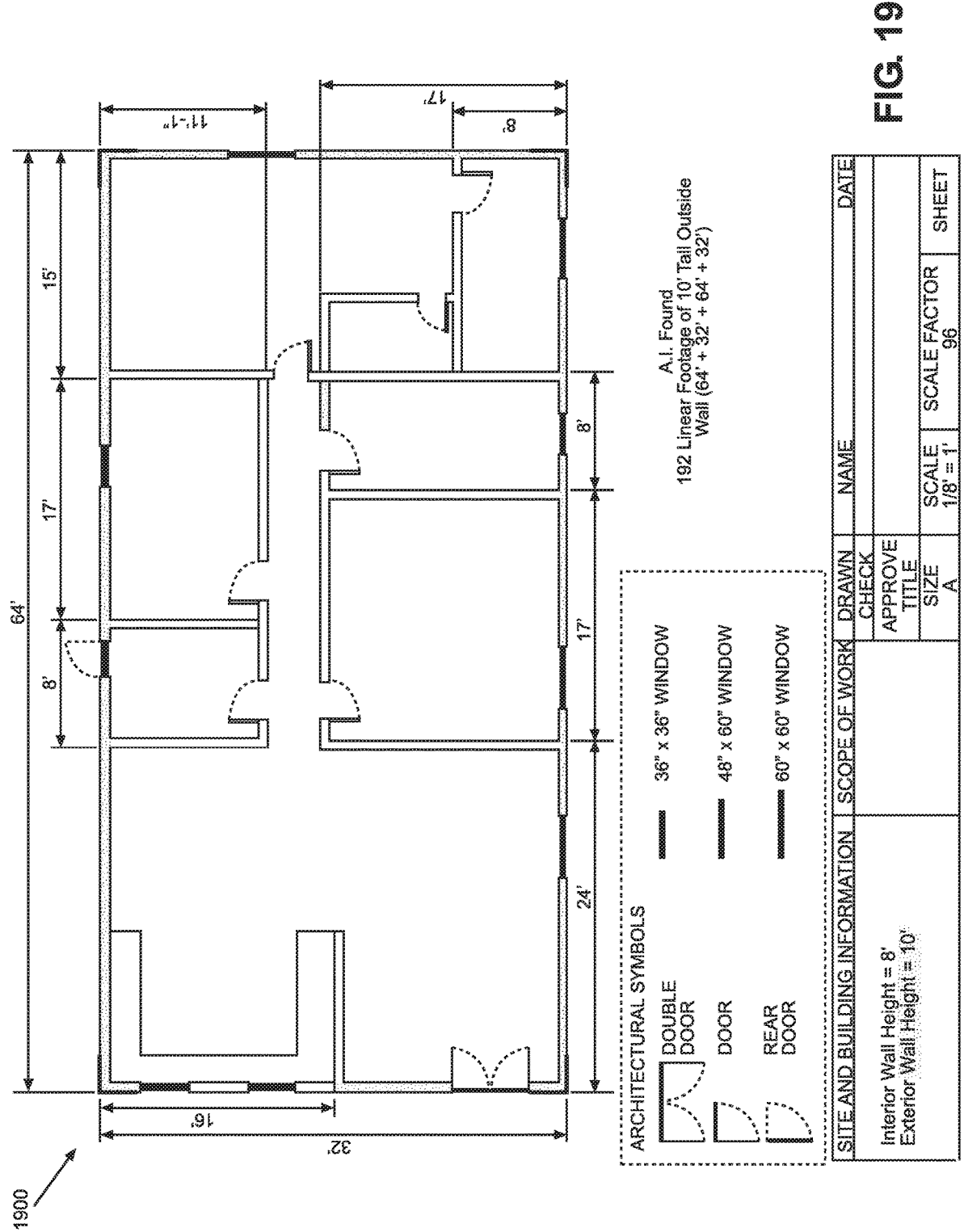
Figure 20:
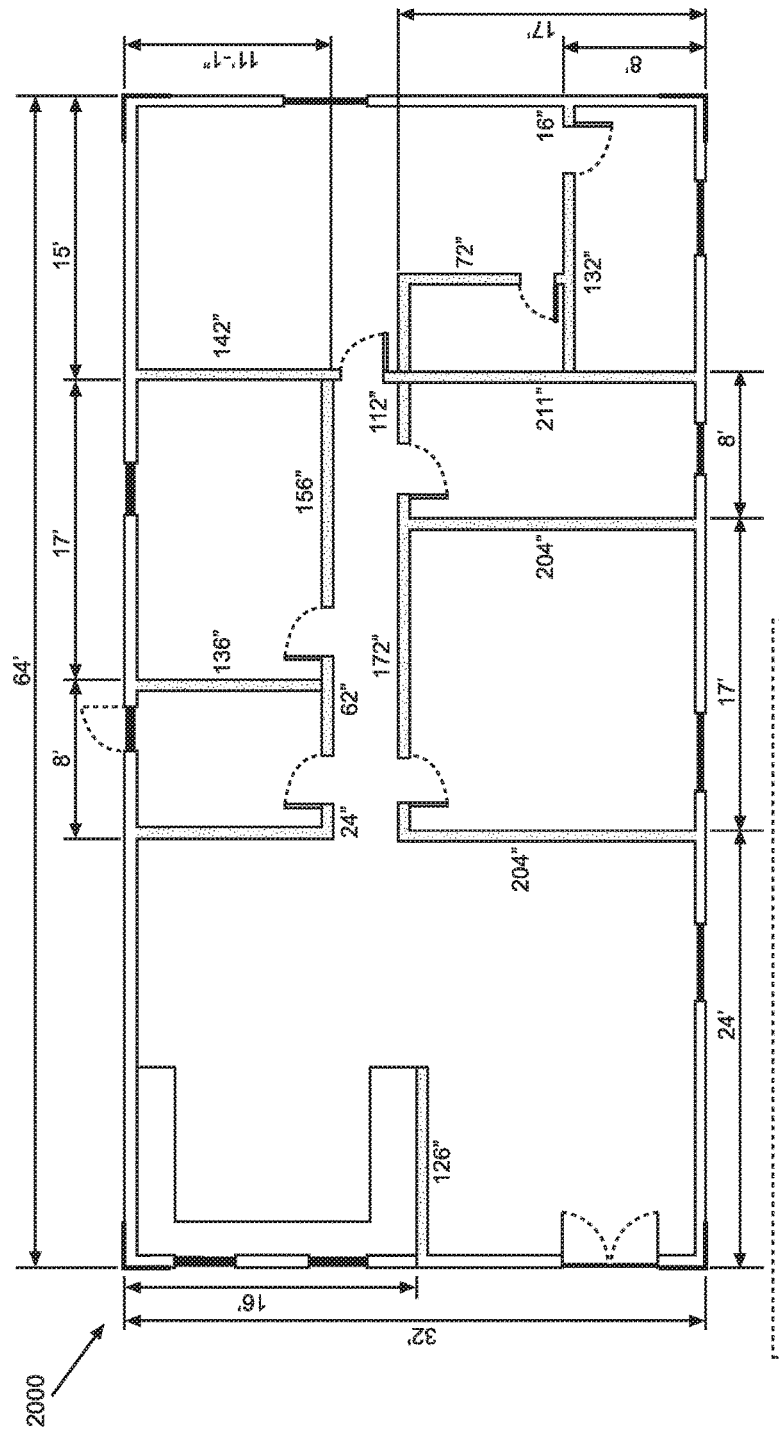

FIG. 18 shows that after the artificial intelligence measures all walls found, it calculates and summarizes exterior and interior wall lengths by section and their respective totals, which is also shown in FIGS. 19-20.

FIG. 19 shows that the artificial intelligence of the system determined that 192 linear footage of 10 foot tall outside walls will be required.

FIG. 20 shows that the artificial intelligence of the system determined that 147.41 linear footage of 8 foot tall inside walls will be required.

Figure 21:
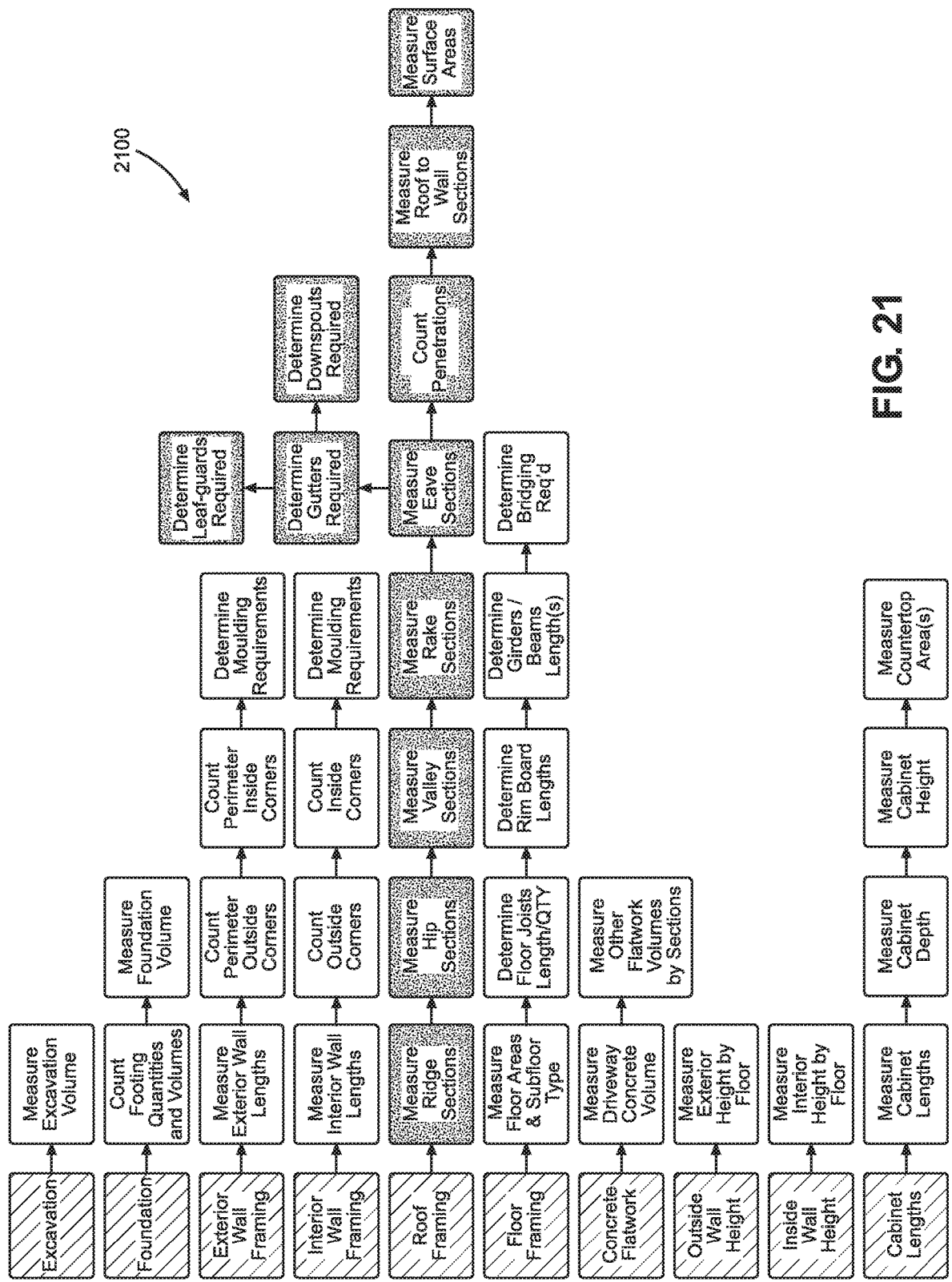

FIG. 21 shows that after the floor plan or other document is uploaded and scanned, the items in the far left hand column would be primary starting points for the artificial intelligence of the system to focus on. Once those starting points are identified within the drawings, the remaining steps would be completed accordingly.

Figure 22:
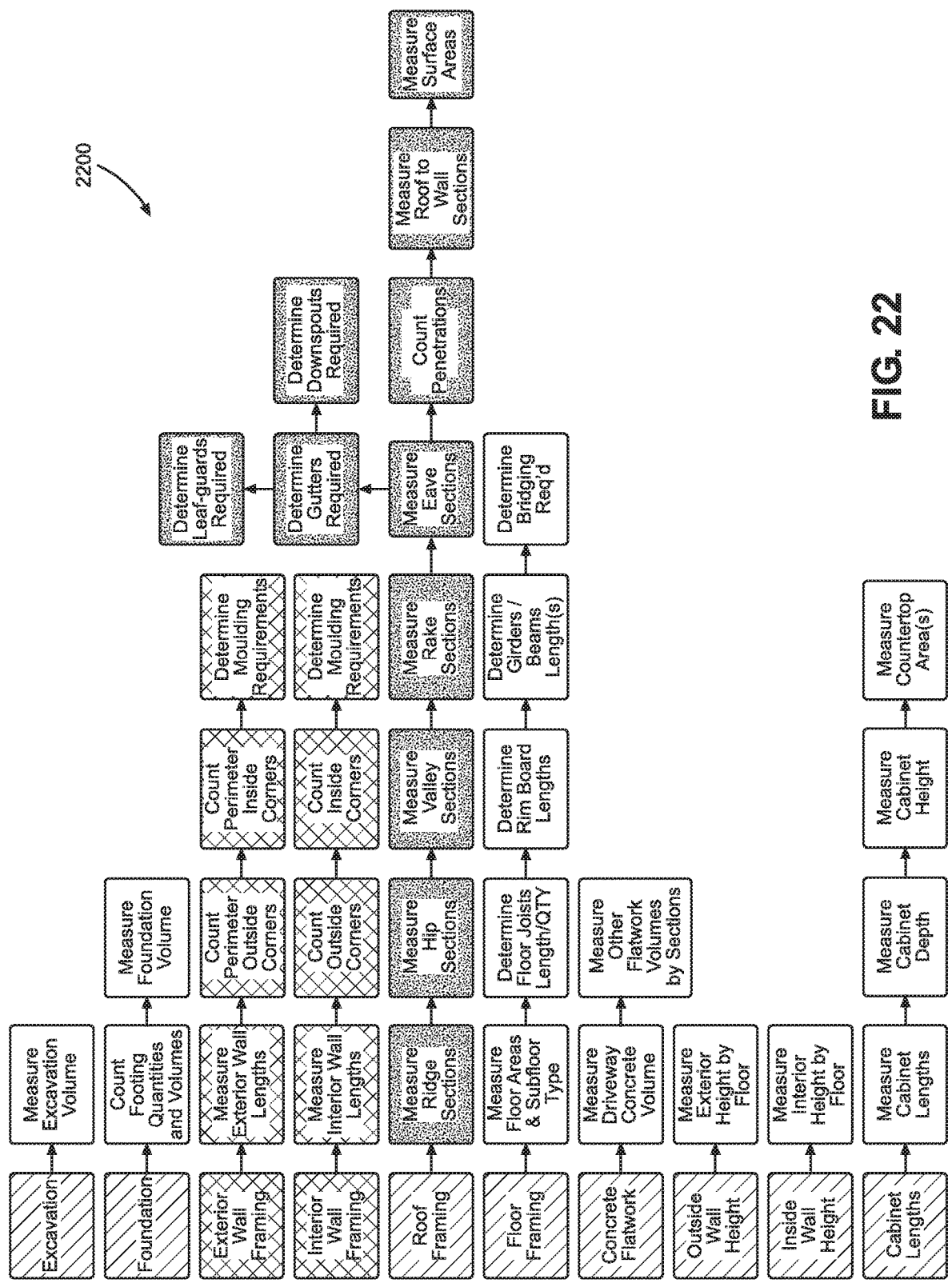

FIG. 22 shows the process of the steps the artificial intelligence of the system will take as it goes through the interior and exterior framing analysis.

Figure 23:
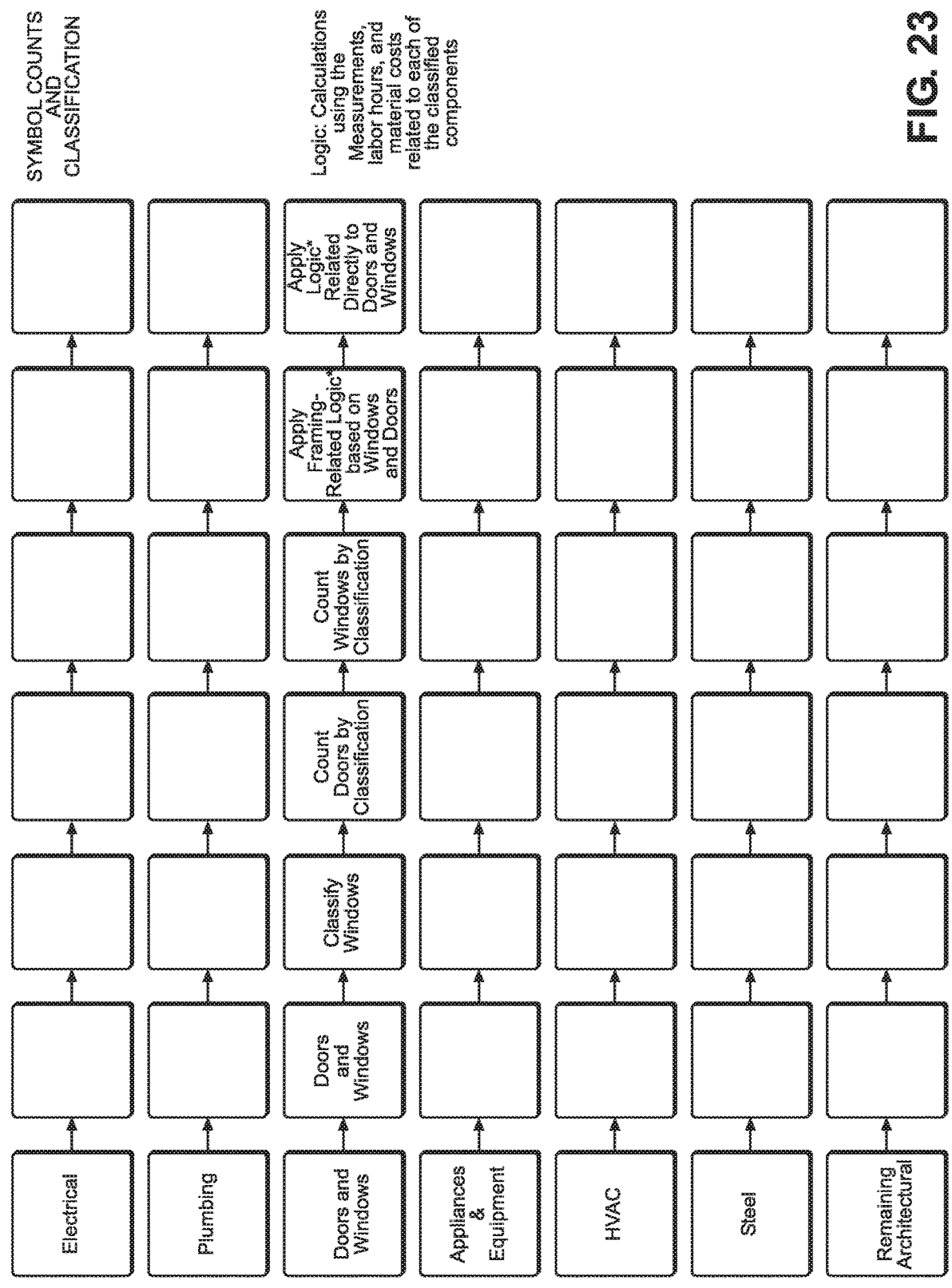

FIG. 23 shows that after the artificial intelligence of the system performs symbol counts and classification, it will determine calculations using the measurements, labor hours, and material costs related to each of the classified components.

Figure 24:
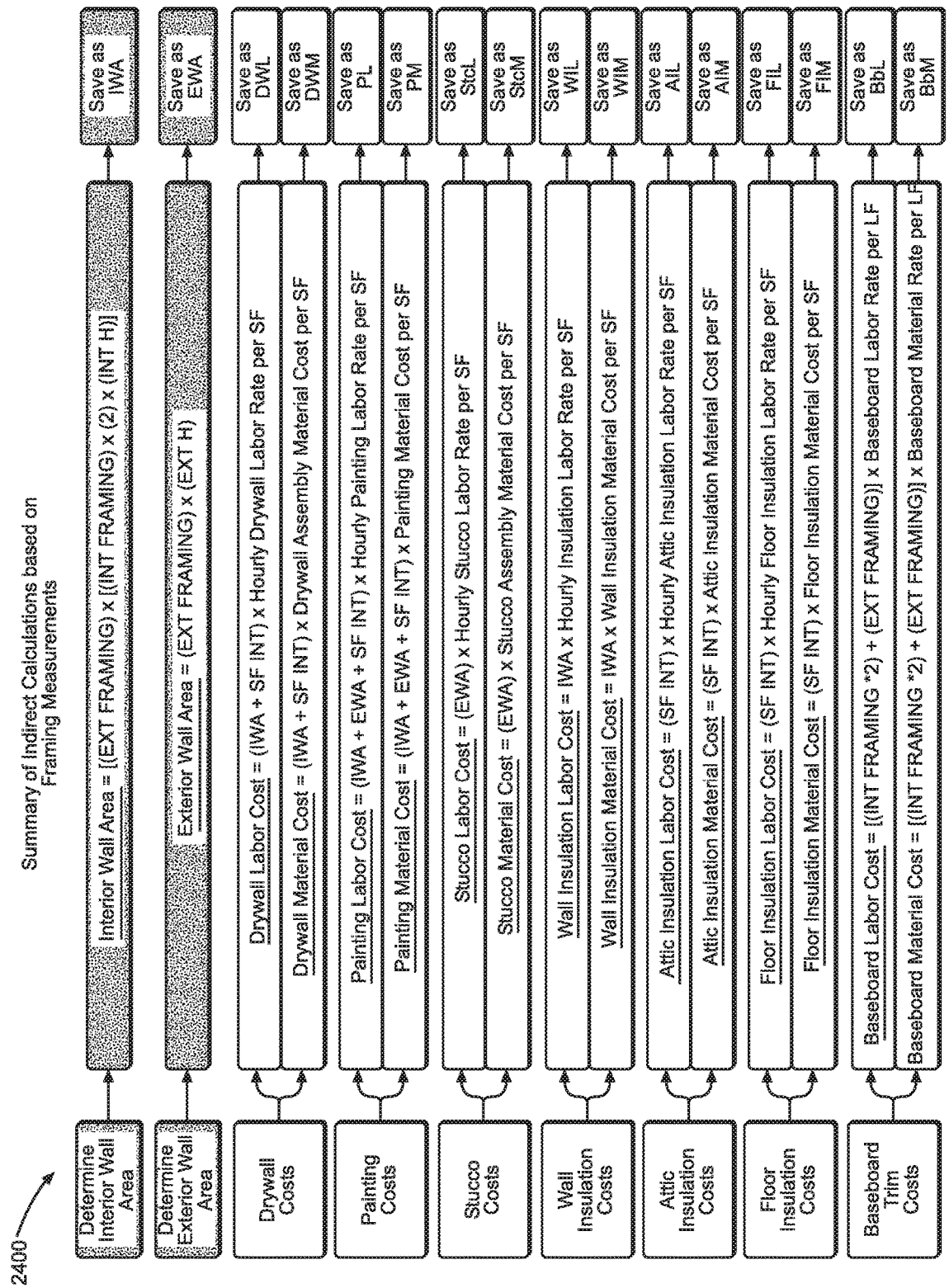

FIG. 24 shows a summary of indirect calculations determined by the artificial intelligence of the system based on framing measurements.

FIG. 24 includes some examples of what could be integrated within the functionality of various exemplary embodiments. For example, upon the processing of a file, in this case a file of an architectural drawing representing a residential structure, one of the elements identified may be the exterior framing, floor framing, and interior framing of the structure. Upon identification and further processing of these elements—with or without related data—the exterior framing, floor framing, and interior framing would be quantified in linear feet, square feet, and linear feet, respectively.

Immediately upon quantification of these specific figures, the artificial intelligence (A.I.) would be able to logically infer aspects of related elements found within the drawing without explicitly identifying these elements, thus minimizing the need for processing resources dedicated to these tasks and speeding up the overall system, inevitably contributing to a smoother user experience for not only the primary user, but all other users who may be accessing the system simultaneously. Such examples of logically inferred aspects of related elements include, but are not limited to, relevant quantity measurements for drywall, painting, stucco, sheathing, insulation, baseboard, and texture.

In addition, the identification of the aforementioned framing components also enables the establishment of minimum and maximum parameters for element aspects, such as interior floor area, which enables self-regulation of the system. For example, the A.I. may quantify the floor area and verify that it falls within the parameters established by the framing measurements, upon other things, before proceeding to further infer various other element aspects, such as foundation dimensions.

The A.I. is able to then use the previously collected data, as well as a self-updating database of various costs, among other data, as input data that it to be applied predetermined base logic, in addition to continuously A.I.-refined logic, algorithms, region-specific data, etc. to produce one or more file outputs that may include a PDF of a highly-detailed, specific, and granular material list, cost breakdowns, resource requirements, client-facing summary documents, etc. relating to the formation of the residence detailed in the drawing(s).

All steps, from when the architectural drawing begins processing the drawing until the output summary data and documents are produced, are structured to drastically reduce the computing time and resources needed to accomplish this and similar goals, while simultaneously allowing for the most statistically accurate and precise creation of outputs that dramatically exceed what can be accomplished by both humans and current technology. The aforementioned goal used as an example typically takes days, weeks, or even months to accomplish using current technology, and carries significant margins of error ranging from 5% to 20% or more, leading to a significant sum of wasted resources on a global scale. Furthermore, even with the use of currently available technology to accomplish this particular goal, it is extremely impractical to the point of being effectively impossible to refine data outputs to a more accurate level due to exponentially greater resources required to extract more and more granular, specific data. The A.I. innovation described in this application would allow for rapid, granular dissection of digital data and transform it to user-ready report, or other output, on a potentially large scale for this and other goals—with or without human intervention. Finally, a significant added benefit is that this all occurs near-instantaneously from the end-user's perspective.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. An intelligent secure networked system configured by at least one processor to execute instructions stored in memory, the system comprising:
    a data retention system and a predictive analytics system;
    a web services layer providing access to the data retention and predictive analytics systems;
    an application server layer that:
        provides a user-facing application that accesses the data retention and predictive analytics systems through the web services layer; and
        performs processing based on user interaction with a goal-based planning application, the goal-based planning application configured to execute instructions including:
    applying artificial intelligence by:
    detecting digital data;
    acting based upon a characteristic of the digital data;
    extracting an aspect of the digital data;
    applying predetermined logic to the aspect of the digital data;
    categorizing the digital data after application of the predetermined logic; and
    formulating the categorized digital data for physical transformation.

2. The system of claim 1, further comprising the data retention system and the predictive analytics system wherein both are in secure isolation from a remainder of the intelligent secure networked system.

3. The system of claim 1, further comprising the user-facing application being secured through use of a security token cached on a web browser that provides the user-facing application.

4. The system of claim 1, further comprising the application server layer performing asynchronous processing.

5. The system of claim 1, further comprising a batching service, wherein the application server layer transmits a request to the web services layer for data, the request processed by the batching service transparently to a user.

6. The system of claim 5, further comprising the request processed by the batching service transparently to the user such that the user can continue to use the user-facing application without disruption.

7. The system of claim 1, the instructions further including:
    the acting based upon a second characteristic of the digital data.

8. The method system of claim 1, further comprising the detecting including optically recognizing a context.

9. The system of claim 8, further comprising determining an action based on the context.

10. The system of claim 2, further comprising determining the aspect of the digital data to be extracted based on the action.

11. The system of claim 1, further comprising the predetermined logic including formulas, database information, and market data.

12. The system of claim 1, further comprising the categorizing being based on an element of the physical transformation.

13. The system of claim 12, further comprising the element being a roof of a structure.

14. The system of claim 12, further comprising the element being plumbing of a structure.

15. The system of claim 12, further comprising the element being framing of a structure.

16. The system of claim 12, further comprising the element being doors and windows of a structure.

17. The system of claim 1, further comprising receiving user input.

18. The system of claim 17, further comprising the user input including a desired profit margin, a labor cost, a material selection, a modification of an output.

19. The system of claim 18, further comprising creating a database of user inputs.

20. The system of claim 19, further comprising creating a subset of the database of the user inputs based upon a shared geographical region.

21. The system of claim 20, further comprising the predetermined logic including the user inputs based upon the shared geographical region.

22. The system of claim 21, further comprising the formulating including a report of an output.

23. The system of claim 22, further comprising the detecting being based upon an algorithm.

24. The system of claim 23, further comprising adjusting the algorithm based upon a previous output.

25. The system of claim 24, further comprising the database including the previous output.

26. The system of claim 1, further comprising the formulating of the categorized digital data including a user modification of an output.

27. The system of claim 26, further comprising associating an input with the user modified output.

28. The system of claim 27, further comprising automatically generating the user modified output upon receiving the input.

29. The system of claim 1, further comprising applying additional predetermined logic to the aspect of the digital data to categorize the digital data for an additional category.

\* \* \* \* \*